United States Patent

Hatamiya et al.

[11] Patent Number: 5,211,906
[45] Date of Patent: May 18, 1993

[54] REACTOR CONTAINMENT VESSEL

[75] Inventors: Shigeo Hatamiya; Masanori Naitoh, both of Hitachi; Yoshiyuki Kataoka, Ibaraki; Hiroaki Suzuki, Hitachi; Isao Sumida, Ibaraki; Toshitsugu Nakao, Hitachi; Kanehiro Ochiai, Hitachi; Tsuyoshi Niino, Hitachi; Masataka Hidaka, Hitachi; Tohru Fukui, Hitachi; Ryuhei Kawabe, Hitachi, all of Japan

[73] Assignee: Hitachi, Ltd., Tokyo, Japan

[21] Appl. No.: 615,921

[22] Filed: Nov. 20, 1990

[30] Foreign Application Priority Data

Nov. 22, 1989 [JP] Japan .................................. 1-302186

[51] Int. Cl.⁵ .............................................. G21C 13/00
[52] U.S. Cl. .................................. 376/293; 376/283; 376/294
[58] Field of Search ............... 376/293, 295, 296, 282, 376/283; 976/DIG. 180, DIG. 181, DIG. 193, DIG. 191

[56] References Cited

U.S. PATENT DOCUMENTS

| 4,021,297 | 5/1977 | Weber ................................. 376/293 |
| 5,011,652 | 4/1991 | Tominaga et al. .................. 376/293 |
| 5,049,353 | 9/1991 | Conway et al. ..................... 376/293 |

Primary Examiner—Donald P. Walsh
Assistant Examiner—Frederick H. Voss
Attorney, Agent, or Firm—Antonelli, Terry, Stout & Kraus

[57] ABSTRACT

A pressure control chamber of a reactor containment vessel for receiving the atmosphere of the reactor containment vessel containing leakage steam developing in the event of an accident includes a pressure control pool, and a wet well disposed above the pressure control pool. The wet well is divided into an inner peripheral portion and an outer peripheral portion. The inner and outer peripheral portions are communicated with each other via the pressure control pool. An outlet port for flowing the atmosphere of the reactor containment vessel containing the leakage steam is provided at the inner peripheral side of the pressure control pool. When the atmosphere of the reactor containment vessel containing the leakage steam is introduced into the pressure control pool in the event of the accident, this atmosphere is condensed by the water in the pressure control pool, and the gas of this atmosphere not condensed is accumulated in the inner peripheral portion of the wet well. As a result, the pressure within the inner peripheral portion is increased to increase the water level of the pressure control pool at the outer peripheral portion, so that the area of contact of a reactor containment vessel wall with the pressure control pool water is increased, thereby enhancing a heat radiation performance of the reactor containment vessel.

7 Claims, 22 Drawing Sheets

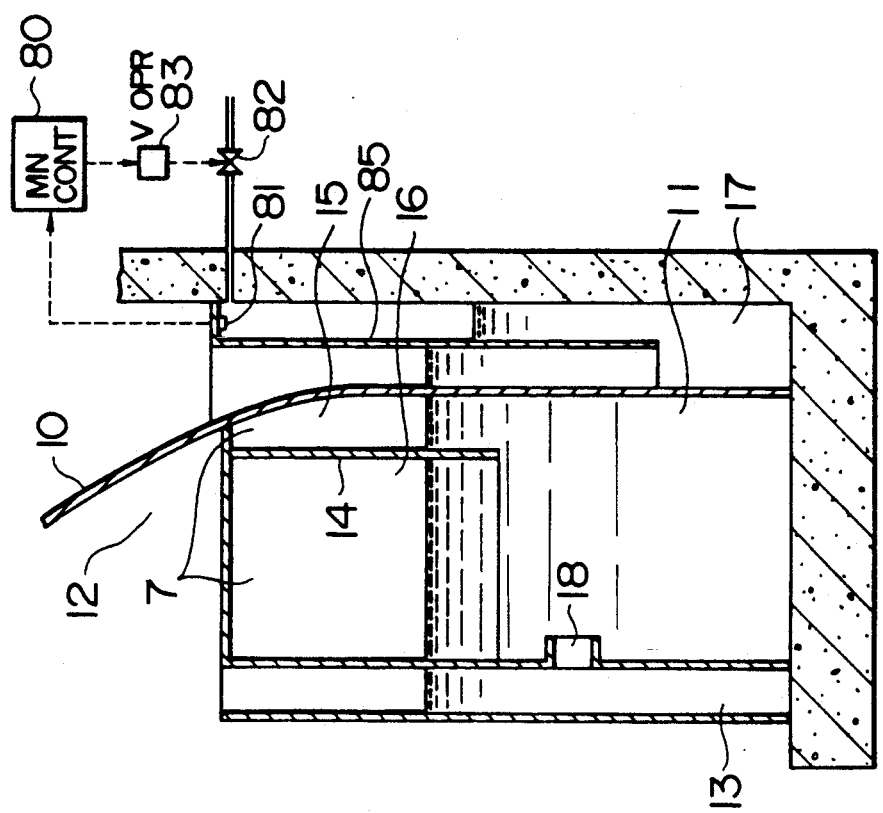
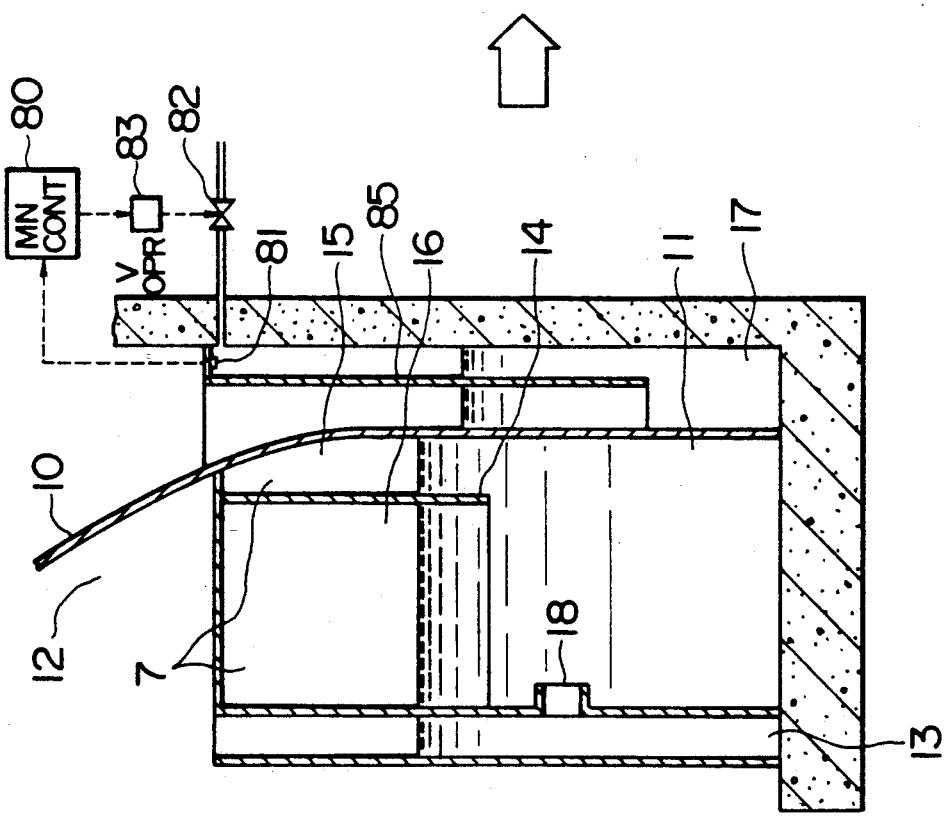

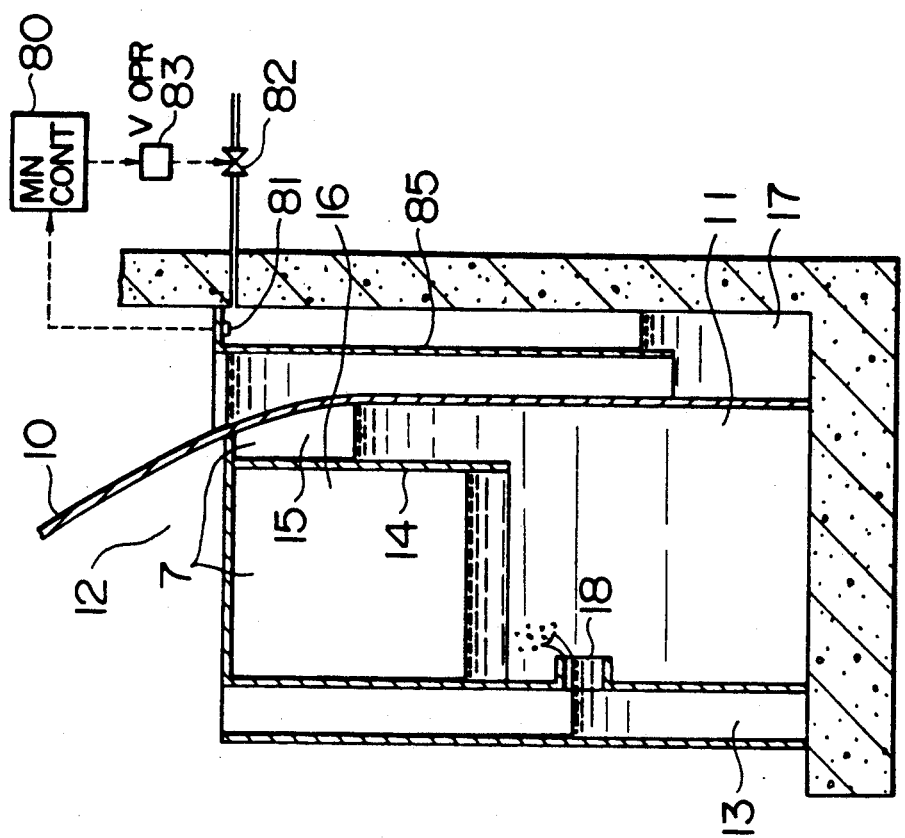
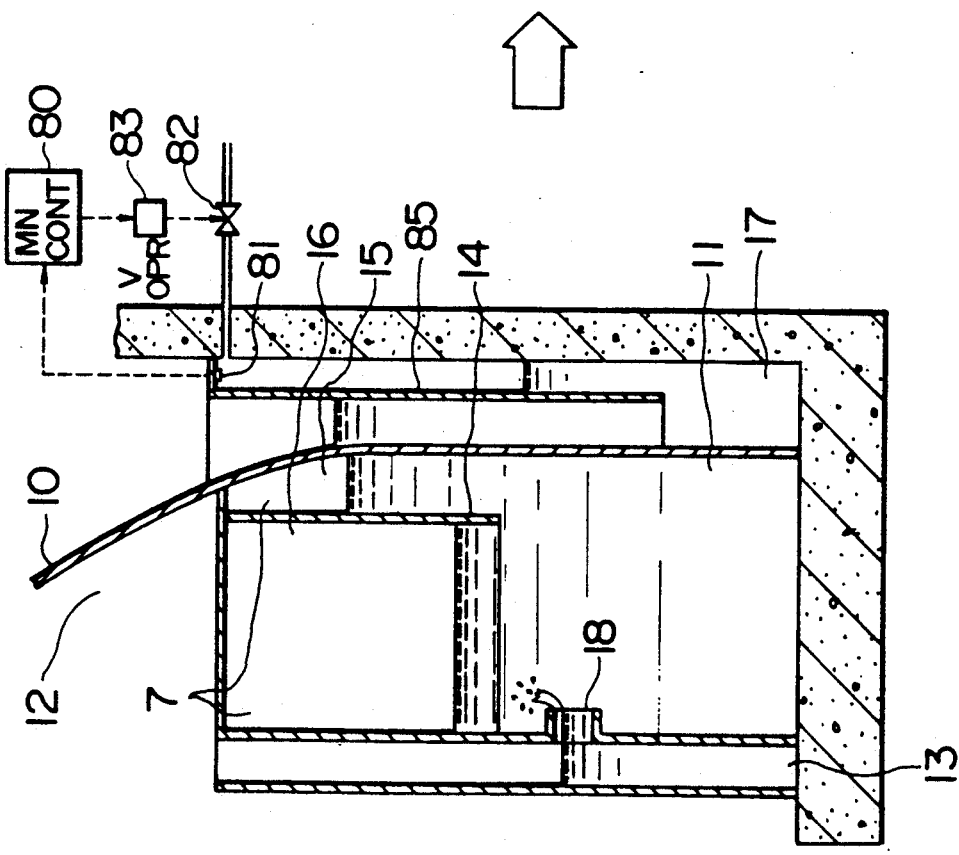

REACTOR CONTAINMENT VESSEL

BACKGROUND OF THE INVENTION

This invention relates to techniques used as safety equipment for a nuclear reactor and suited for removing decay heat produced in a reactor core at the time of an accident in which a reactor coolant to be supplied into a reactor containment vessel or primary containment vessel is lost.

Examples of reactor safety equipment include the following.

Japanese Patent Unexamined Publication No. 63-191096 proposes a method used in a small- to a medium-size reactor (having an electric power cf up to about 600 MW) so as to statically remove decay heat for a long cooling period after the occurrence of a coolant losing accident, utilizing natural force. More specifically, an outer peripheral pool is provided around the outer periphery of a reactor containment vessel, and the heat inside the reactor containment vessel is transferred to the outer peripheral pool due to a temperature difference between the inside and outside of the reactor containment vessel, and the heat is finally removed from the reactor containment vessel by convection and evaporation of the pool water in the outer peripheral pool. Further, a method was reported in Fall Meeting of the Atomic Energy Society of Japan held in October, 1989, in which a convection promoting plate is provided in water in a pressure control pool in the above reactor containment vessel so as to promote the circulation of this pool water, thereby efficiently radiating the heat of the water of the pressure control pool to the outer peripheral pool via the wall of the reactor containment vessel.

Also, as described in JSME Mechanical Engineer's Handbook C7 (1989), a method is adopted in a large-size reactor (having an electric power of about 1,350 MW), in which a pump and a heat exchanger are used so as to remove decay heat produced in a reactor core in the event of a coolant losing accident.

Any of the above methods effectively removes the heat from the reactor containment vessel to decrease the pressure within the reactor containment vessel.

However, such prior art has the following problems to be solved.

In the method used in the large-size reactor, in addition to the pump and the heat exchanger, auxiliary equipment such as an emergency electricity-generating equipment (energy generating means) for driving the pump is needed for removing the decay heat produced in the reactor core at the time of the coolant losing accident. Therefore, this method has problems that the dynamic equipment is required for removing the decay heat and that the construction is complicated.

On the other hand, the method disclosed in the above Japanese Patent Unexamined Publication No. 63-191096 obviates the need for such dynamic equipment, and therefore the equipment is less liable to a malfunction, which enhances the reliability. However, if this method is adopted directly in the large-size reactor, the heat removal amount per unit area is smaller with this method than with a method using dynamic equipment such as a pump and a heat exchanger. This results in a problem that the reactor containment vessel must be increased in size.

SUMMARY OF THE INVENTION

It is an object of this invention to provide a reactor containment equipment which is less liable to a malfunction of dynamic equipment to enhance the reliability in operation, and can efficiently reduce the pressure within the reactor containment vessel.

According to a 1st aspect of the invention, there is provided a reactor containment vessel for mounting in an outer peripheral pool, comprising a dry well portion for containing a reactor pressure vessel; a pressure control chamber for condensing steam in the dry well portion; and a division wall mounted within the pressure control chamber, the division wall dividing the wet well, as well as a water surface of a pool water of a pressure control pool elevated by the condensation of the steam, into an inner peripheral portion and an outer peripheral portion, the inner peripheral portion being disposed close to an outlet port for feeding the steam into the pressure control chamber, the outer peripheral portion being disposed adjacent to the outer peripheral pool, and the inner and outer peripheral portions being communicated with each other via the pressure control chamber. When the steam of high temperature and pressure in the reactor pressure vessel leaks in a large amount into the dry well in the reactor containment vessel, this leakage steam flows, together with the gas (e.g. non-condensable gas such as nitrogen) in the dry well, into the inner peripheral portion of the pressure control pool. The steam thus fed into the pressure control pool is condensed in the pressure control pool to rise the temperature of the water in the pressure control pool, and the non-condensable gas thus fed into the pressure control pool is accumulated in the inner peripheral portion of the wet well. As a result, the partial pressure of the non-condensable gas in the inner peripheral portion of the wet well becomes higher than the partial pressure of the non-condensable gas in the outer peripheral portion of the wet well. Due to this pressure differential, the water level in the inner peripheral portion is decreased by a communicating tube action whereas the water level in the outer peripheral portion is increased. As a result of the increased water level in the outer peripheral portion, the area of effective transfer of the heat from the reactor containment vessel to the outer peripheral pool is increased, and the ability of heat transfer from the reactor containment vessel to the exterior is enhanced, thereby decreasing the pressure within the reactor containment vessel.

According to a 2nd aspect of the invention, there is provided a reactor containment vessel having a pressure control chamber having a wet well which is divided into an outer peripheral portion and an inner peripheral portion, the outer and inner peripheral portions being communicated with each other via a pressure control pool, and an outlet port for feeding steam into the pressure control pool so as to condense the steam being provided at the pressure control pool at a position close to the inner peripheral portion. Since the wet well of the pressure control chamber is divided, the non-condensable gas fed, together with the steam, into the pressure control pool is accumulated in the inner peripheral portion of the wet well, and the partial pressure of the non-condensable gas in this inner peripheral portion becomes higher than that in the outer peripheral portion. Due to this pressure differential, the water level of the outer peripheral portion is increased, so that the area of contact of the reactor containment vessel wall with the pressure control pool water is increased, thereby enhancing the heat radiation performance.

According to a 3rd aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, and the inner and outer peripheral portions being communicated with each other via the pressure control chamber. The leakage steam in the dry well is fed, together with the gas in the dry well, into the pressure control pool through the steam outlet port. Since the steam outlet port is provided at the inner peripheral portion, the gas not condensed is accumulated in the inner peripheral portion of the wet well in a larger amount than in the outer peripheral portion of the wet well. Therefore, the pressure in the inner peripheral portion of the wet well becomes higher than the pressure in the outer peripheral portion of the wet well, and due to this pressure differential, the water level of the outer peripheral portion is increased, so that the area of contact of the reactor containment vessel wall with the pressure control pool water is increased, thereby enhancing the radiation of the heat to the outer peripheral pool.

According to a 4th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a first section for receiving gas which is fed, together with the steam, from the dry well into the pressure control chamber, and a second reaction disposed adjacent to the outer peripheral pool, the first section being increased in pressure at the time of the condensation, the second section being lower in pressure than the first section at the time of the condensation, and the first and second sections being communicated with each other via pool water in the pressure control chamber. The leakage steam in the dry well is fed, together with the gas in the dry well, into the pressure control chamber, and the gas is received in the first section, so that the pressure in the first section becomes higher than the pressure in the second section. Due to a pressure differential between the two sections, the water level in the section section is increased, and the area of contact of the reactor containment vessel wall with the pressure control pool water is increased, thereby enhancing the radiation of the heat to the outer peripheral pool.

According to a 5th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and a space in each of the inner and outer peripheral portions being communicated with the dry well portion via a valve. In addition to the advantageous effect of the invention of the 3rd aspect, the flowing effect is achieved. Namely, the inner and peripheral portions of the wet well can be communicated with the dry well by opening the valve, so that the pressures in the inner and outer peripheral portions can be equal to each other, and therefore the water levels in the inner and outer peripheral portions of the pressure control pool can be equal to each other. This prevents an undue force from acting on a localized portion in the reactor containment vessel. Thereafter, by closing the valve to again feed the steam into the pressure control pool, the advantageous effect of the invention of the 3rd aspect can be continuously obtained.

According to a 6th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to a outlet port for feeding the steam into the pressure control chamber, the outer peripheral portion being disposed adjacent to the outer peripheral pool, the inner and outer peripheral portions being communicated with each other via the pressure control chamber, and the ratio of the volume of the space of the inner peripheral portion to the volume of the total space of the wet well being at least 0.3. The degree of increase of the water level in the outer peripheral portion, as described in the invention of the 3rd aspect, becomes high as shown in FIG. 3 when the ratio of the volume of the space of the inner peripheral portion to the volume of the total space of the wet well is not less than 0.3. Therefore, the area of contact of the reactor containment vessel wall with the pressure control pool water is increased, thereby enhancing the heat radiation properties of the reactor containment vessel.

According to a 7th aspect of the invention, there is provided a reactor containment vessel for mounting in an outer peripheral pool, comprising a dry well portion for containing a reactor pressure vessel and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the outer peripheral portion being peripherally divided into a plurality of sections, and the outer peripheral portion thus peripherally divided being communicated with the inner peripheral portion via the pressure control chamber. In addition to the advantageous effect of the invention of the 3rd aspect, the following effect is achieved. Namely, the outer peripheral portion is peripherally divided into the plurality of sections, and therefore if there occurs leakage in the means separating the inner and outer peripheral portions from each other, only the water level of that section of the outer peripheral portion influenced by the leakage is not kept increased, but the water level of the other sections not influenced by the leakage is kept increased. Therefore, the radiation of the heat from the reactor containment vessel to the outer peripheral pool can be maintained easily.

According to an 8th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and there being provided a baffle plate disposed in the pressure control pool below the inner peripheral portion, and the baffle plate being disposed in opposed relation to the steam outlet port. In addition to the advantageous effect of the invention of the 3rd aspect, the following effect is achieved. Namely, the gas fed, together with the steam, into the pressure control pool tends to vigorously move toward the outer peripheral portion with the flow in the pressure control pool; however, the flow of the gas impinges on the baffle plate to be retarded, so that the gas is prevented from flowing into the outer peripheral portion. Therefore, the gas can be efficiently accumulated in the inner peripheral portion, so that the water level of the outer peripheral portion can begin to increase at an earlier stage, and also the degree of increase of this water level is high. Thus, the heat radiation effect of the reactor containment vessel can be effectively achieved at an earlier stage after the occurrence of the accident.

According to a 9th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and there being provided a convection promoting plate disposed in the outer peripheral portion of the pressure control pool, and the convection promoting plate extending along an inner wall surface of the reactor containment vessel in spaced relation to the inner wall surface. In addition to the advantageous effect of the invention of the 3rd aspect, the following effect is achieved. Namely, there is positively provided the flow path of the pool water which has a downward path formed between the convection promoting plate and the inner wall surface of the reactor containment vessel and an upward path formed on the opposite side. Therefore, due to this flow path, the transfer of the heat from the pressure control pool water to the wall surface of the reactor containment vessel can be efficiently achieved, thereby enhancing the radiation of the heat to the outer peripheral pool, and satisfactorily decreasing the pressure within the reactor containment vessel.

According to a 10th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and the outer peripheral portion being larger at its upper portion than the outer portion thereof. In addition to the advantageous effect of the invention of the 3rd aspect, the following effect is achieved. Namely, the upper portion of the outer peripheral portion is larger than the other portion thereof, thus enlarging the region for accumulating the gas, and therefore the water level of the outer peripheral portion can rapidly rise to the upper portion, and can be higher. This decreases the partial pressure of the non-condensable gas in the outer peripheral portion, and rapidly increases the area of effective transfer of the heat to the outer peripheral pool thereby enhancing the heat radiation performance of the reactor containment vessel.

According to an 11th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and the outer peripheral portion being communicated with one of the dry well portion and a sealed container disposed in the dry well portion. In addition to the advantageous effect of the invention of the 3rd aspect, the following effect is achieved. Namely, with the increase of the water level of the outer peripheral portion, the gas in the outer peripheral portion can be discharged into the dry well or the sealed container in the dry well. This facilitates the increase of the water level of the outer peripheral portion, and decreases the partial pressure of the non-condensable gas in the outer peripheral portion, thereby enhancing the radiation of the heat to the outer peripheral pool, and satisfactorily decreasing the pressure within the reactor containment vessel.

According to a 12th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, the outer peripheral portion being communicated with the dry well portion via a valve, the inner peripheral portion being communicated with the dry well portion via another valve, and there being provided a spray device for spraying a coolant into the dry well portion. In addition to the advantageous effect of the invention of the 3rd aspect, the following effect is achieved. Namely, the spray device sprays the coolant to the atmosphere of the dry well filled with the high-temperature steam to cool this atmosphere to decrease the pressure within the dry well, so that the pressures within the inner peripheral portion, the outer peripheral portion and the dry well are decreased in this order, thereby rendering the pressure within the dry well lower than the overall pressure within the pressure control chamber. The pressure within the pressure control chamber is decreased by opening the valves. Then, in order that the water level of the outer peripheral portion will not be excessively decreased, the valves are closed in the condition in which the pressures within the inner peripheral portion, the outer peripheral portion and the dry well are decreased in this order, and also the spray device is stopped. As a result, the pressure within the dry well again becomes higher than the pressure within the wet well, so that the steam and the gas in the dry well are again fed into the pressure control pool. As a result, the pressure within the inner peripheral portion of the wet well becomes higher than the pressure within the outer peripheral portion of the wet well, so that the water level of the outer peripheral portion becomes higher than before opening the valves. By repeating this procedure, the heat radiation performance of the reactor containment vessel is enhanced due to the continuous condensing operation and the continuous increase of the area of effective transfer of the heat to the outer peripheral pool.

According to a 13th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, the outer peripheral portion being communicated with the dry well portion via a first vacuum breaker whose discharge side is directed to the dry well portion, the inner peripheral portion being communicated with the dry well via a second vacuum breaker whose discharge side is directed to the dry well portion, an operating differential pressure for operating the second vacuum breaker being greater than an operating differential pressure for operating the first vacuum breaker; and there being provided a spray device for spraying a coolant into the dry well portion; sensing means for sensing the pressure within the dry well portion, and control means for effecting a spraying operation of the spray device for a predetermined period of time after the sensing means senses a high-pressure condition of the dry well portion. In addition to the advantageous effect of the invention of the 3rd aspect, the following effect is achieved. Namely, when the pressure within the dry well is further increased by the steam of high temperature and pressure leaking into the reactor containment vessel after the water level of the outer peripheral portion of the pool is increased as described above for the invention of the 3rd aspect, the increase of the pressure within the dry well is sensed by the pressure sensing means, and the control means is responsive to the result of this sensing so as to cause the spray device to operate for the predetermined time period. As a result, the atmosphere of the dry well filled with the steam of high temperature is cooled by the coolant sprayed from the spray device to decrease the pressure within the dry well, so that the pressures within the inner peripheral portion, the outer peripheral portion and the dry well are decreased in this order. As a result, the pressure differential between each of the outer peripheral portion and the inner peripheral portion and the dry well reaches the operating differential pressure to thereby open each vacuum breaker, so that the pressure within the pressure control chamber is decreased. Before the water level of the outer peripheral portion is excessively decreased, the differential pressure becomes a value other than the operating differential pressure of each vacuum break in the condition in which the pressures within the inner peripheral portion, the outer peripheral portion and the dry well are decreased in this order. As a result, each vacuum breaker is closed, and the spray device is stopped after a predetermined time period. By doing so, the pressure within the dry well again becomes higher than the pressure within the wet well, so that the steam and the gas in the dry well are again fed into the pressure control pool. As a result, the pressure within the inner peripheral portion of the wet well becomes higher than the pressure within the outer peripheral portion of the wet well, so that the water level of the outer peripheral portion becomes higher than before opening the vacuum breakers. By repeating this procedure, the heat radiation performance of the reactor containment vessel is enhanced by automatically effecting the continuous condensing operation and the continuous increase of the area of effective transfer of the heat to the outer peripheral pool.

According to a 14th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and a outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber, and gas suction means being connected to the outer peripheral portion via a valve. In addition to the advantageous effect of the invention of the 3rd aspect, the following effect is achieved. Namely, before the steam of high temperature and pressure leaks into the reactor containment vessel, the valve is opened to cause the gas suction means to discharge the gas in the outer peripheral portion to the exterior of the outer peripheral portion, so that the water level of the outer peripheral portion is rendered higher than the water level of the inner peripheral portion. By closing the valve, this high water level of the outer peripheral portion is maintained. In this condition, when the steam of high temperature and pressure leaks into the reactor containment vessel, the non-condensable gas is accumulated in the inner peripheral portion as the leakage steam is condensed in the pressure control chamber, so that the pressure within the inner peripheral portion is increased. As a result, the water level of the outer peripheral portion is further increased, thereby enhancing the heat radiation performance of the reactor containment vessel.

According to a 15th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber; there being provided gas suction means connected to the outer peripheral portion via a valve, sensing means provided at the outer peripheral portion so as to sense the water level of the outer peripheral portion, and control means for opening the valve and for operating the gas suction means; and control means, when receiving from the sensing means a sensing signal representative of a predetermined water level of the outer peripheral portion, closing the valve to stop the operation of the gas suction means. In addition to the advantageous effect of the invention of the 3rd aspect, the following effect is achieved. Namely, when the water level sensing means has not yet sensed the predetermined water level before the steam of high temperature and pressure leaks into the reactor containment vessel, the control means continues to operate the suction means and to open the valve. Therefore, the gas in the outer peripheral portion is discharged therefrom, so that the water level of the outer peripheral portion becomes higher than the water level of the inner peripheral portion. When the water level of the outer peripheral portion reaches a predetermined level, the water level sensing means feeds this sensing result (representative of this predetermined water level) to the control means. Upon receipt of this sensing result, the control means closes the valve to stop the suction means, so that the water level of the outer peripheral portion is kept higher than the water level of the inner peripheral portion before the steam of high temperature and pressure leaks into the reactor containment vessel. When the steam of high temperature and pressure leaks into the reactor containment vessel, the gas is accumulated in the inner peripheral portion as the leakage steam is condensed in the pressure control chamber, so that the pressure within the inner peripheral portion is increased. As a result, the water level of the outer peripheral portion is further increased, thereby enhancing the heat radiation performance of the reactor containment vessel.

According to a 16th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to an outlet port for feeding the steam into the pressure control chamber, the outer peripheral portion being disposed adjacent to the outer peripheral pool, the inner and outer peripheral portions being communicated with each other via the pressure control chamber; a gas accumulating chamber being provided in the outer peripheral pool, and having a port opening to the pool water in the outer peripheral pool; gas feed/discharge means being connected to the gas accumulating chamber via a valve; and means for measuring a water level in the gas accumulating chamber being provided in the gas accumulating chamber. In addition to the advantageous effect of the invention of the 3rd aspect, the following effect is achieved. Namely, as cooling water is fed to the outer peripheral pool, the water level of the outer peripheral pool increases. When the valve is in an open condition, the water surface in the accumulating chamber upwardly urges the gas in the accumulating chamber to discharge the gas via the gas discharge means, so that the water level of the accumulating chamber increases in the same manner as the water level outside the accumulating chamber. When the predetermined water level of the accumulating chamber is sensed, the valve is closed. In this condition, when the condensation in the pressure control chamber is started, the heat in the pressure control chamber is transferred to the outer peripheral pool to increase the temperature of the cooling water, so that the temperature of the gas in the accumulating chamber is increased to thereby increase the pressure within the accumulating chamber. As a result, the water level the accumulating chamber is lowered, so that the cooling water contained in the accumulating chamber is discharged to the outer peripheral pool outside this chamber. As a result, the water level in the outer peripheral pool in contact with the reactor containment vessel rises, so that the area of contact of the outer peripheral pool with the reactor containment vessel is increased, thereby enhancing the heat radiation performance of the reactor containment vessel.

According to a 17th aspect of the invention, there is provided a reactor containment vessel for mounting in an outer peripheral pool, comprising a dry well portion for containing a reactor pressure vessel; and a pressure control chamber for condensing steam in the dry well portion, the pressure control chamber including a pressure control pool, and a wet well disposed above the pressure control pool, the wet well being divided into an inner peripheral portion and an outer peripheral portion, the inner peripheral portion being disposed close to a outlet port for feeding the steam into the pressure control chamber, the outer peripheral portion being disposed adjacent to the outer peripheral pool, the inner and outer peripheral portions being communicated with each other via the pressure control chamber; a gas accumulating chamber being provided in the outer peripheral pool, and having a port opening to the pool water in the outer peripheral pool; gas feed/discharge means being connected to the gas accumulating chamber via a valve; means for measuring a water level in the gas accumulating chamber being provided in the gas accumulating chamber; there being provided control means for receiving measurement results of the water level measuring means, and the control means closing the valve in response to a sensing signal which is fed from the water level measuring means and represents a predetermined water level of the gas accumulating chamber. In addition to the advantageous effect of the invention of the 3rd aspect, the following effect is achieved. Namely, as cooling water is fed to the outer peripheral pool, the water level of the outer peripheral pool increases. When the valve is in an open condition, the water surface in the accumulating chamber upwardly urges the gas in the accumulating chamber to discharge the gas via the gas discharge means, so that the water level of the accumulating chamber increases in the same manner as the water level outside the accumulating chamber. When the predetermined water level of the accumulating chamber is sensed, the control means is responsive to this sensing signal to close the valve. In this condition, when the condensation in the pressure control chamber is started, the heat in the pressure control chamber is transferred to the outer peripheral pool to increase the temperature of the cooling water, so that the temperature of the gas in the accumulating chamber is increased to thereby increase the pressure within the accumulating chamber. As a result, the water level of the accumulating chamber is lowered, so that the cooling water contained in the accumulating chamber is discharged to the outer peripheral pool outside this chamber. As a result, the water level in the outer peripheral pool in contact with the reactor containment vessel rises, so that the area of contact of the outer peripheral pool with the reactor containment vessel is increased, thereby enhancing the heat radiation performance of the reactor containment vessel.

According to an 18th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and cuter peripheral portions being communicated with each other, and the wet well portions of the inner and outer peripheral portions being separated from each other. When the steam of high temperature and pressure in the reactor pressure vessel leaks in a large amount into the dry well in the reactor containment vessel, the leakage steam flows, together with the gas (e.g. non-condensable gas such as nitrogen) in the dry well, into the inner peripheral portion of the pressure control pool. The steam thus fed into the pressure control pool is condensed in the pressure control pool to rise the temperature of the water in the pressure control pool, and the non-condensable gas thus fed into the pressure control pool is accumulated in the inner peripheral portion of the wet well. As a result, the partial pressure of the non-condensable gas in the inner peripheral portion of the wet well becomes higher than the partial pressure of the non-condensable gas in the outer peripheral portion of the wet well. Due to this pressure differential, the water level in the inner peripheral portion is decreased by a communicating tube action whereas the water level in the outer peripheral portion is increased. As a result of the increased water level in the outer peripheral portion, the area of effective transfer of the heat from the reactor containment vessel to the outer peripheral pool is increased, and the transfer of the heat from the reactor containment vessel of steel to the outer peripheral pool is enhanced, thereby decreasing the pressure in the reactor containment vessel.

According to a 19th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the inner and outer peripheral portions being separated from each other by an outer peripheral wall portion of the internal structural wall, and the pressure control pool portions of the inner and outer peripheral portions being connected to each other by a communication hole formed through the outer peripheral wall portion. When the steam of high temperature and pressure in the reactor pressure vessel leaks in a large amount into the dry well in the reactor containment vessel, the leakage steam flows, together with the gas (e.g. non-condensable gas such as nitrogen) in the dry well, into the inner peripheral portion of the pressure control pool. The steam thus fed into the pressure control pool is condensed in the pressure control pool to rise the temperature of the water in the pressure control pool, and the non-condensable gas thus fed into the pressure control pool is accumulated in the inner peripheral portion of the wet well. As a result, the partial pressure of the non-condensable gas in the inner peripheral portion of the wet well becomes higher than the partial pressure of the non-condensable gas in the outer peripheral portion of the wet well. Due to this pressure differential, the water level in the inner peripheral portion is decreased by a communicating tube action whereas the water level in the outer peripheral portion is increased. As a result of the increased water level in the outer peripheral portion, the area of contact of the the reactor containment vessel wall with the outer peripheral pool is increased, and the transfer of the heat from the reactor containment vessel of steel to the outer peripheral pool is enhanced, thereby decreasing the pressure in the reactor containment vessel.

According to a 20th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the inner and outer peripheral portions being separated from each other by an outer peripheral wall portion of the internal structural wall, the pressure control pool portions of the inner and outer peripheral portions being connected to each other by communication holes formed through the outer peripheral wall portion, and the communication holes being vertically spaced from each other. In addition to the advantageous effect of the invention of the 19th aspect, the following effect is achieved. Namely, when the steam of high temperature and pressure in the reactor pressure vessel leaks in a large amount into the dry well in the reactor containment vessel, the leakage steam flows, together with the gas (e.g. non-condensable gas such as nitrogen) in the dry well, into the inner peripheral portion of the pressure control pool. As a result, this inflow force cooperates with the force of rising of the non-condensable gas due to buoyancy to positively produce such a natural circulation of the pressure control pool water that the path of this circulation passes through the upper and lower communication holes. Due to this circulation, the transfer of the heat from the pressure control pool water to the reactor containment vessel wall of steel is enhanced, so that the radiation of the heat from the reactor containment vessel to the outer peripheral pool is enhanced, thereby decreasing the pressure within the reactor containment vessel.

According to a 21st aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, a convection promoting plate being provided in the pressure control pool of the outer peripheral portion intermediate a height thereof, and the convection promoting plate being spaced from an inner wall surface of the reactor containment vessel of steel. In addition to the advantageous effect of the invention of the 18th aspect, the following effect is achieved. Namely, when the steam of high temperature and pressure in the reactor pressure vessel leaks in a large amount into the dry well in the reactor containment vessel, the leakage steam flows, together with the gas (e.g. non-condensable gas such as nitrogen) in the dry well, into the inner peripheral portion of the pressure control pool. As a result, this inflow force cooperates with the force of rising of the non-condensable gas due to buoyancy to positively produce such a natural circulation of the pressure control pool water that this circulation has a downward flow path formed between the convection promoting plate and the inner surface of the reactor containment vessel of steel. Due to this circulation, the transfer of the heat from the pressure control pool water to the reactor containment vessel wall of steel is enhanced, so that the radiation of the heat from the reactor containment vessel to the outer peripheral pool is enhanced, thereby decreasing the pressure within the reactor containment vessel.

According to a 22nd aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, and an inlet of a vent passage for guiding the steam into the pressure control pool portion of the inner peripheral portion being disposed above a normal water level of the pressure control pool portion of the inner peripheral portion and below an upper end of the inner peripheral portion of the pressure control chamber. In addition to the advantageous effect of the invention of the 18th aspect, the following effect is achieved. Namely, at the initial stage of the feeding of the leakage steam from the dry well into the inner peripheral portion of the pressure control chamber via the vent passage, the water level of the pressure control pool is still so low that the distance between the ceiling of the pressure control chamber and the pool water surface is large. Therefore, even though the steam and the non-condensable gas are vigorously fed into the pressure control pool, the pool water surface will not fluctuate to such an extent as to strike the ceiling of the pressure control chamber. After this feeding force becomes weak, the cooling water fed into the dry well and residing at the lower portion of the dry well or above the pressure control chamber is introduced into the pressure control chamber at a relatively early stage through the vent passage because the inlet of the vent passage is disposed below the upper portion of the pressure control chamber, so that the pool water level in the pressure control chamber is increased. Because of this water level increase, the transfer of the heat from the pressure control pool to the reactor containment vessel wall of steel is enhanced, and the water level of the inner peripheral portion of the pressure control pool is increased, and therefore the condensation of the steam can be effected satisfactorily even when the water level is low.

According to a 23rd aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions the pressure control pool portions of the inner and outer peripheral portions being communicated with each other, the wet well portions of the inner and outer peripheral portions being separated from each other, and the wet well portion of the outer peripheral portion being wider at its upper portion than at its lower portion. In addition to the advantageous effect of the invention of the 18th aspect, the following effect is achieved. Namely, as the condensation proceeds in the pressure control chamber, the water level in the outer peripheral portion of the wet well increases. Since the upper portion of the outer peripheral portion of the wet well is wider than that of the lower portion thereof, the partial pressure of the gas in the outer peripheral portion of the wet well is lower as compared with other constructions, and therefore the water level is increased at a greater rate, thereby enhancing the heat radiation performance of the reactor containment vessel.

According to a 24th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, and the wet well portion of the outer peripheral portion being peripherally divided into a plurality of sections. In addition to the advantageous effect of the 18th aspect of the invention, the following effect is achieved. Namely, the wet well of the outer peripheral portion is divided peripherally into the plurality of sections, and therefore even when one or more of the wet well sections are caused to accidentally communicate with the space of the inner peripheral portion through a crack or the like, only the water level in those wet well sections communicated through the crack is lowered, and the water level in the other wet well sections is kept elevated thereby maintaining the heat radiation effect of the reactor containment vessel.

According to a 25th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, and a baffle plate being provided in the pressure control pool in opposed relation to an outlet port for the steam. In addition to the advantageous effect of the 18th aspect of the invention, the following effect is achieved. Namely, the steam and the non-condensable gas, fed or flown from the dry well into the pressure control pool through the steam outlet port, tend to move toward the outer peripheral portion with the flow caused by this inflow force in the pressure control pool; however, this flow impinges on the baffle plate to be blocked, so that the non-condensable gas is prevented from flowing into the wet well of the outer peripheral portion. Therefore, the gas can be effectively accumulated in the wet well of the inner peripheral portion, thereby greatly increasing the pressure differential between the inner peripheral portion and the outer peripheral portion. As a result, the water level of the outer peripheral portion is increased, and the heat radiation performance of the reactor containment vessel is enhanced.

According to a 26th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, there being provided a reactor core-submerging pipe having an inlet disposed in that region of the pool water of the pressure control pool disposed below an outlet port for feeding the steam into the pressure control pool, and an outlet of the reactor core-submerging pipe opening to the reactor pressure vessel being disposed below the water level of the vent tube. In addition to the advantageous effect of the invention of the 18th aspect, the following effect is achieved. Namely, when the condensation takes place in the pressure control chamber, the pool water of high temperature rises in the pool, and the temperature of the pool water disposed above the steam outlet port becomes higher than the temperature of the pool water disposed below the steam outlet port. The inlet of the reactor core-submerging pipe is disposed in the low-temperature lower region of the pool water, and the low-temperature pool water is supplied into the reactor pressure vessel through the reactor core-submerging pipe to thereby cool the reactor core.

According to a 27th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, there being provided a reactor core-submerging pipe having an inlet disposed in that region of the pool water of the pressure control pool disposed below an outlet port for feeding the steam into the pressure control pool, an outlet of the reactor core-submerging pipe opening into the reactor pressure vessel being disposed below the water level of the pressure control pool, and a degassing opening for removing gas in the reactor core-submerging pipe being formed in the reactor core-submerging pipe. In addition to the advantageous effect of the invention of the 26th aspect, the following effect is achieved. Namely, the non-condensable gas, introduced into the reactor core-submerging pipe together with the pool water when supplying the pool water into the reactor pressure vessel, is returned to the pressure control pool via the degassing opening, and is accumulated in the wet well of the inner peripheral portion. With this arrangement, bubbles are prevented from moving to the reactor pressure vessel through the reactor core-submerging pipe, thereby preventing the cooling effect from being adversely affected.

According to a 28th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, there being provided a reactor core-submerging pipe having an inlet disposed in that region of the pool water of the pressure control pool disposed below an outlet port for feeding the steam into the pressure control pool, an outlet of the reactor core-submerging pipe opening into the reactor pressure vessel being disposed below the water level of the pressure control pool, a degassing opening for removing gas in the reactor core-submerging pipe being formed in the reactor core-submerging pipe, and the degassing opening becoming narrower toward its distal end from which the gas is discharged. In addition to the advantageous effect of the invention of the 27th aspect, the following effect is achieved. Since the cross-sectional area of the air passage of the degassing opening is tapered or becomes narrower toward the upper air outlet, the reverse flow of the pool water into the reactor core-submerging pipe through the opening hardly occurs, and only the low-temperature pool water can be supplied into the reactor pressure vessel, thereby enhancing the cooling of the reactor core.

According to a 29th aspect of the invention, there is provided a reactor containment vessel comprising an internal structural wall provided within the reactor containment vessel, the internal structural wall constituting a dry well portion for containing a reactor pressure vessel, an inner peripheral portion of a pressure control chamber for condensing steam in the dry well portion, and an emergency reactor core cooling pool disposed at an upper portion of the internal structural wall and communicating with the reactor pressure vessel, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, and a space in the wet well portion of the outer peripheral portion being communicated with a space in the emergency reactor core cooling pool. In addition to the advantageous effect of the invention of the 18th aspect, the pool water in the emergency reactor core cooling pool is supplied into the reactor pressure vessel to cool the reactor core, and is heated at the reactor core to be converted into steam, and is fed from the reactor pressure vessel into the dry well, and is condensed in the pressure control chamber. As a result of the condensation of the steam, the water level in the outer peripheral portion increases, and the volume of the gas phase portion in the emergency reactor core cooling pool increases since the pool water in the emergency reactor core cooling pool is supplied into the reactor pressure vessel. Since this gas phase portion is communicated with the gas phase portion of the outer peripheral portion, the same effect as achieved by the enlargement of the outer peripheral portion of the wet well can be obtained, so that the increase of the water level of the outer peripheral portion is promoted. Accordingly, the transfer of the heat from the pressure control pool to the reactor containment vessel wall of steel is enhanced, so that the radiation of the heat from the reactor containment vessel to the outer peripheral pool is enhanced, thereby decreasing the pressure within the reactor containment vessel.

According to a 30th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, the reactor containment vessel surrounding an operation floor, and the operation floor being communicatable with a space in the wet well portion of the outer peripheral portion via a pressure release valve. In addition to the advantageous effect of the invention of the 18th aspect, the following effect is achieved. Namely, as the water level of the outer peripheral portion increases, the pressure within the upper gas phase portion of the outer peripheral portion increases, so that the water level can not easily be increased, as in the invention of the 18th aspect. However, when the pressure within the gas phase portion increases to such an extent as to stop the increase of the water level, the pressure release valve responds to this pressure and is opened to communicate the operation floor with the upper gas phase portion of the outer peripheral portion. As a result, the pressure of the gas phase portion is released into the operation floor, thereby providing a pressure condition allowing an easy increase of the water level of the outer peripheral portion. Therefore, the area of heat transfer from the pressure control pool water to the reactor containment vessel wall of steel is increased, so that the radiation of the heat from the reactor containment vessel to the outer peripheral pool is enhanced, thereby decreasing the pressure within the reactor containment vessel.

According to a 31st aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, and the wet well portions of the inner and outer peripheral portions being communicated with each other. The steam, leaking from the reactor pressure vessel into the dry well, is fed into the pressure control pool water of the inner peripheral portion to be condensed. At the same time, the non-condensable gas fed from the dry well into this pool water is accumulated in the wet well to increase the pressure thereof. Because of the condensation of the steam, the pressure control pool water is increased, and the amount of the pool water of the pressure control pool disposed in contact with the outer peripheral pool through the reactor containment vessel wall of steel is increased, thereby increasing the amount of heat radiation to the outer peripheral pool. On the other hand, the non-condensable gas in the wet well is released into the wet wet of the vertically-extensive outer peripheral portion formed between the outer peripheral wall portion of the structural wall and the reactor containment vessel wall of steel, thereby decreasing the pressure, so that there can be rapidly obtained a pressure condition in which the steam can be easily introduced from the dry well into the pressure control chamber. As a result, the condensation is promoted, and therefore the pressure within the reactor containment vessel can be decreased.

According to a 32nd aspect of the invention, there is provided a reactor containment vessel comprising an internal structural wall provided within the reactor containment vessel, the internal structural wall constituting a dry well portion for containing a reactor pressure vessel, an inner peripheral portion of a pressure control chamber for condensing steam in the dry well portion, and an emergency reactor core cooling pool disposed at an upper portion of the internal structural wall and communicating with the reactor pressure vessel, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being communicated with each other, and a space in the wet well portion of the outer peripheral portion being communicated with a space in the emergency reactor core cooling pool. In addition to the advantageous effect of the invention of the 31st aspect, the following effect is achieved. Namely, the pressure within the wet well of the inner peripheral portion is released into the wet well portion of the outer peripheral portion, so that the former pressure is decreased as in the invention of the 31st aspect. Here, this pressure is also released into the gas phase portion of the emergency reactor core cooling pool, and therefore the pressure within the wet well can be further decreased. Further, the emergency reactor core cooling pool water is supplied into the reactor pressure vessel as cooling water for the reactor core, and is heated at the reactor core to be converted into steam, and is fed from the pressure vessel into the dry well, and is condensed in the pressure control chamber. The steam finally transfers the heat of the reactor core into the pressure control pool, and this heat is radiated therefrom to the outer peripheral pool. Due to this heat radiation and a wide distribution of the non-condensable gas, the pressure within the reactor containment vessel is further decreased.

According to a 33rd aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, the reactor containment vessel surrounding an operation floor, the operation floor being communicatable with a space in the wet well portion of the outer peripheral portion via a pressure release valve, and that portion of the reactor containment vessel which surrounds the operation floor being covered with a wall having a gas inlet at its lower portion and a gas outlet at its upper portion. In addition to the advantageous effect of the invention of the 30th aspect, the following effect is achieved. Namely, the pressure within the outer peripheral portion is released into the operation floor via the pressure release valve, and the high-temperature gas in the outer peripheral portion is dispersed into the operation floor. Due to a temperature difference between the interior of the operation floor and the exterior of the containment vessel, the gas disposed outside of the reactor containment vessel of steel is passed through the passage between the outer wall of this reactor containment vessel and the wall covering the reactor containment vessel from the lower inlet to the upper outlet. When the gas is thus passed, the heat is removed from the reactor containment vessel of steel, thus performing an air cooling function. Therefore, the interior of the reactor containment vessel is satisfactorily cooled, thereby suppressing the increase of the pressure within the reactor containment vessel.

According to a 34th aspect of the invention, there is provided a reactor containment vessel comprising an internal structural wall provided within the reactor containment vessel, the internal structural wall constituting a dry well portion for containing a reactor pressure vessel, and an inner peripheral portion of a pressure control chamber for condensing steam in the dry well portion, the internal structure wall being surrounded by the reactor containment vessel of steel in such a manner that the internal structural wall is spaced from a reactor containment vessel wall to form an outer peripheral portion of the pressure control chamber, the reactor containment vessel being disposed in an outer peripheral pool, the inner and outer peripheral portions having respective pressure control pool portions and respective wet well portions disposed above the pressure control pool portions, the pressure control pool portions of the inner and outer peripheral portions being communicated with each other, the wet well portions of the inner and outer peripheral portions being separated from each other, the reactor containment vessel surrounding an operation floor, the operation floor being communicatable with a space in the wet well portion of the outer peripheral portion via a pressure release valve, that portion of the reactor containment vessel which surrounds the operation floor being covered with a wall having a gas inlet at its lower portion and a gas outlet at its upper portion, and a radiator plate being provided in a space between the wall and that portion of the reactor containment vessel surrounding the operation floor. In addition to the advantageous effect of the invention of the 33rd aspect, the following effect is achieved. The radiator plate, provided between the wall covering the upper portion of the reactor containment of steel and that portion of the reactor containment vessel surrounding the operation floor, receives the radiation heat from the reactor containment vessel, so that the opposite sides of the radiator plate are air-cooled. This achieves a better cooling effect as compared with the case where only the reactor containment vessel wall is cooled, thereby suppressing the increase of the pressure within the reactor containment vessel more satisfactorily.

BRIEF DESCRIPTION OF THE DRAWINGS

FIGS. 17A and 17B are vertical cross-sectional views of a portion of an 8th embodiment of a reactor containment vessel of the invention, showing portions of a pressure control chamber and an outer peripheral pool, and showing a variation before and after the control of the water level of the outer peripheral pool;

FIGS. 18A and 18B are views similar to FIGS. 17A and 17B, but showing a variation before and after the control of the water level of the outer peripheral pool in the event of an accident;

DESCRIPTION OF THE PREFERRED EMBODIMENTS

Figure 1:
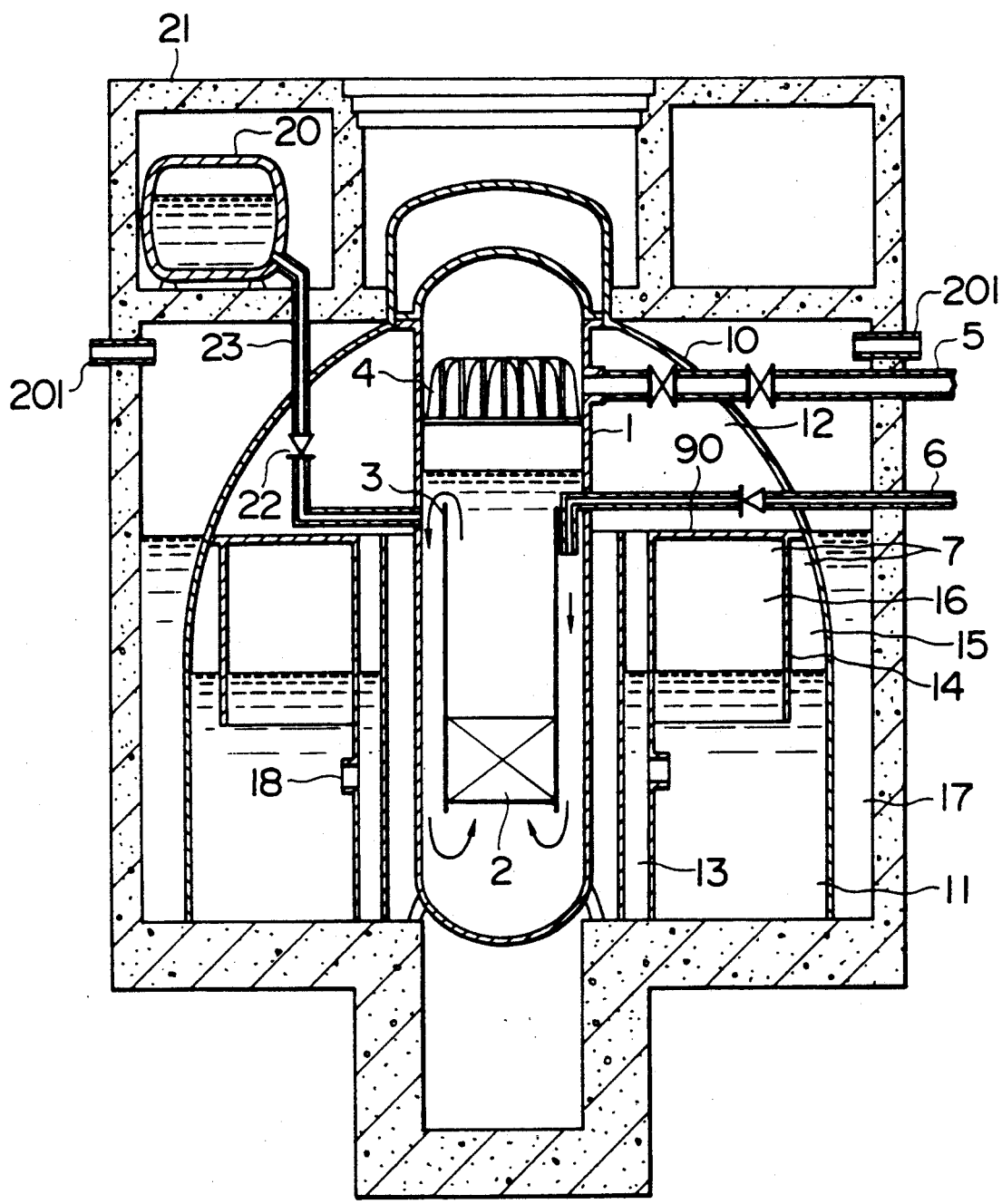
FIG. 1 is a vertical cross-sectional view of a 1st embodiment of a reactor containment vessel of the invention.

A first embodiment of the invention will now be described with reference to FIGS. 1 to 4.

In the first embodiment, the present invention is applied to a natural circulating-type reactor having an electric output power of 600 MW.

A reactor core 2 mounted within a reactor pressure vessel 1 is surrounded by a riser 3. Steam of high temperature and pressure produced at the reactor core 2 is deprived of moisture by a dryer 4, and then is fed to a turbine (not shown) via a main steam piping 5. Although not shown in the drawings, the turbine drives a generator, and the generator supplies electric power to a load.

The steam used in the turbine is condensed by a condenser (not shown) into a liquid of low temperature and pressure, and is returned into the reactor pressure vessel 1 via a feedwater piping 6. A coolant flows to the reactor core 2 due to a natural circulation caused by a pressure differential between the inside and outside of the riser 3, so as to remove the heat from the reactor core 2.

The reactor pressure vessel 1 is surrounded by a reactor containment vessel wall or wall of primary containment vessel 10 made of steel. Nitrogen gas (non-condensable gas) is filled in the space enclosed by the reactor containment vessel wall 10.

The space enclosed by the reactor containment vessel wall 10 constitutes a pressure control chamber. This pressure control chamber has a pressure control pool 11 for receiving, via steam outlet ports 18, the steam of high temperature and pressure, emitted from the reactor pressure vessel 1 at the time of a piping rupture accident, and for condensing this steam. The pressure control chamber also has a vent tube 13 for guiding the steam, fed from a dry well 12, into the pressure control pool 11, and a wet well 7 disposed above the surface or level of the water in the pressure control pool 11, and a division wall 14 partitioning or dividing the wet well 7.

The wet well 7 defined by an upper space of the pressure control pool 11 is divided into an outer peripheral portion 15 and an inner peripheral portion 16 by the division wall 14 which is disposed at its lower end portion below the water surface of the pressure control pool 11.

An outer peripheral pool 17 is provided around the pressure control chamber, and is open to the atmosphere via pipes 201. Part of the reactor containment vessel wall 10 is in contact with pool water in the outer peripheral pool 17.

A water storage tank 20 is provided at an upper position within a concrete building 21 enclosing the reactor containment vessel wall 10. The water storage tank 20 is connected to the interior of the reactor pressure vessel 1 by a pipe 23 via a check valve 22.

Cooling water is beforehand stored in the water storage tank 20, and the pressure within the water storage tank 20 is kept to a level sufficiently high to feed the cooling water from the water storage tank 20 into the reactor pressure vessel 1 after the occurrence of the piping rupture accident.

In the reactor of this construction, when a coolant losing accident occurs due to a rupture of the piping (e.g. the main steam piping 5), the coolant in the reactor pressure vessel 1 is converted into steam of high temperature and pressure, and flows into the dry well 12 via the ruptured portion (opening) of the main steam piping 5. As a result, the pressure within the reactor pressure vessel 1 decreases whereas the pressure within the dry well 12 increases.

At the time of the accident, control rods (not shown) are inserted into the reactor core 2, and the power of the reactor is rapidly decreased. This also contributes to the decrease of the pressure within the reactor pressure vessel 1. As the pressure within the reactor pressure vessel 1 decreases, the pre-pressurized coolant in the water storage tank 20 is fed into the reactor pressure vessel 1 via the pipe 23 and the check valve 22, so that the water level in the reactor pressure vessel 1 is kept sufficiently higher than the upper end of the reactor core 2.

On the other hand, when the pressure within the dry well 12 increases, this pressure increase lowers the water level in the vent tube 13, and when this water level becomes lower than the level of the steam outlet ports 18, the steam and the nitrogen (non-condensable gas) flow from the dry well 12 into the pressure control pool 11.

Figure 2C:
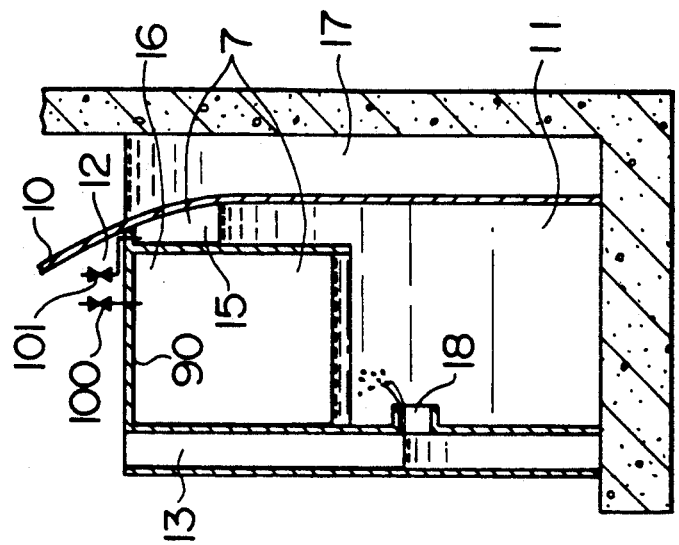
FIGS. 2A to 2C are vertical cross-sectional views of portions of a pressure control chamber and an outer peripheral pool of the 1st embodiment, showing the sequence of the operation from the normal condition to the condition of an accident.

Behaviors of the water level in the pressure control pool 11 occurring at this time will now be described with reference to FIGS. 2A to C. FIG. 2A shows the water level during a normal operation, and in this case the water level in the vent tube 13 is equal to that of the pressure control pool 11. Incidentally, the pool water is supplied to the pressure control pool 11 from a storage tank (not shown) by a pump before the reactor is activated, and at this time shut-off valves 100 and 101 connected between the wet well 7 and the dry well 12 are opened, so that all the water levels are the same. After the pool water is supplied to the pressure control pool 11, the valves 100 and 101 are closed.

Figure 2B:
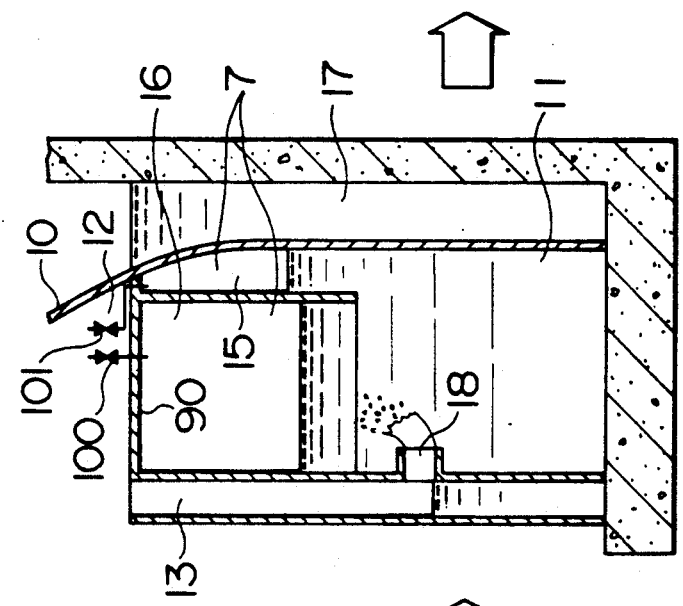
Figure 2A:
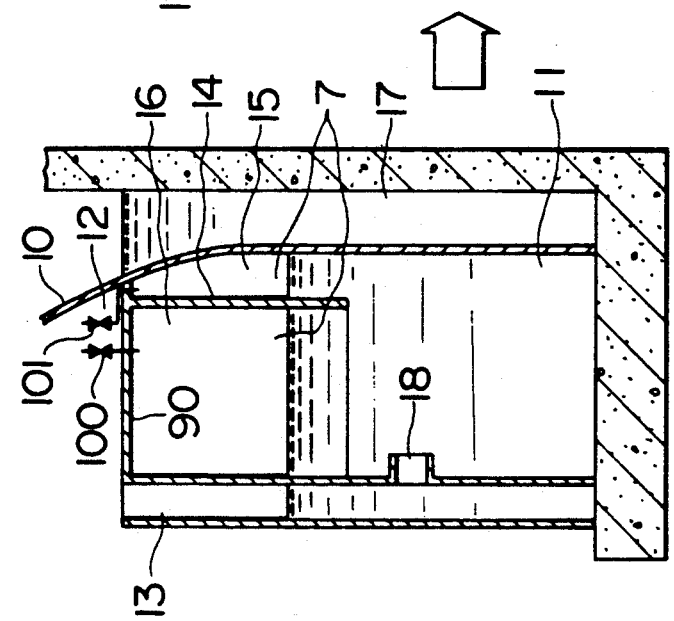

At the time of the piping rupture accident, the pressure within the dry well 12 increases, and the water level in the vent tube 13 decreases, so that the steam and the nitrogen (non-condensable gas) flow from the dry well 12 into the pressure control pool 11, as shown in FIG. 2B. The steam thus introduced is condensed by the pressure control pool water, but the nitrogen thus introduced rises due to buoyancy and is accumulated in the upper space of the inner peripheral portion 16. As a result, the partial pressure of the nitrogen accumulated in the inner peripheral portion 16 is higher than the partial pressure of the nitrogen in the outer peripheral portion 15, and therefore the water level in the inner peripheral portion 16 is decreased due to this nitrogen partial pressure difference, so that the water level in the outer peripheral portion 15 increases. The nitrogen in the dry well 12 is all shifted into the upper space of the inner peripheral portion 15 in about five minutes, so that the water level difference between the inner peripheral portion 16 and the outer peripheral portion 15 becomes the maximum as shown in FIG. 2C.

Figure 3:
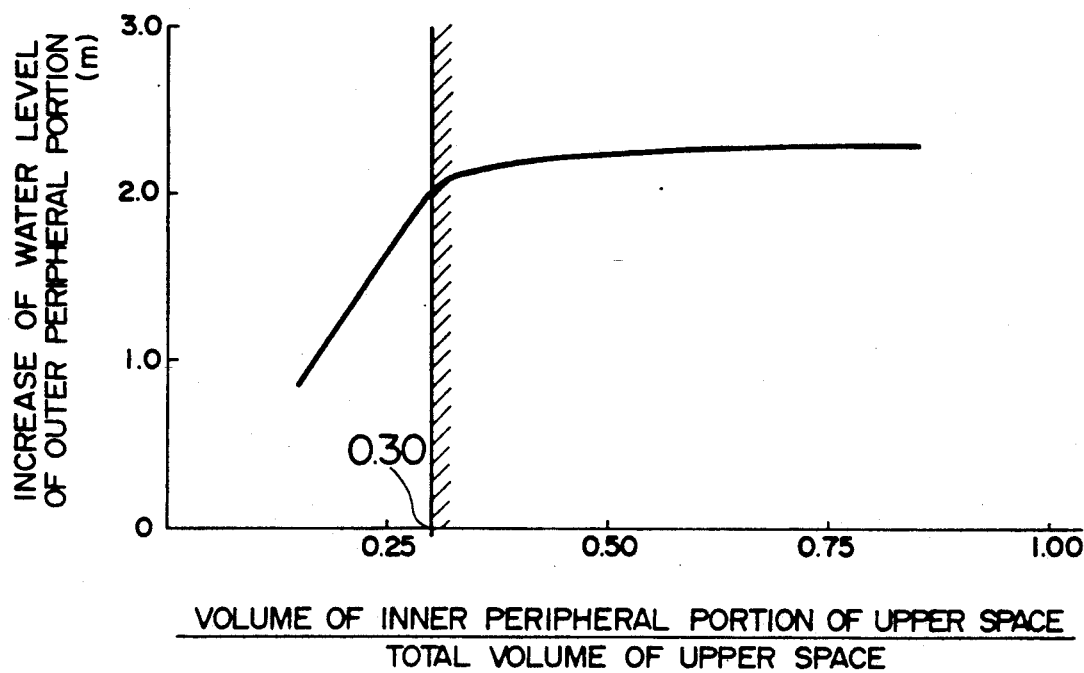
FIG. 3 is a graph showing the degree of increase of the water level of the outer peripheral portion with respect to a variation in the volume ratio of the upper spaces of the inner and outer peripheral portions of the pressure control chamber of the reactor containment vessel of the 1st embodiment.

FIG. 3 shows the degree of increase of the water level of the outer peripheral portion 15 when the upper space of the pressure control pool 11 is divided into the inner peripheral portion 16 and the outer peripheral portion 15, as in this embodiment. It will be appreciated that the degree of increase of the water level of the outer peripheral portion 15 is high when the ratio of the volume of the upper space of the inner peripheral portion 16 to the total volume of the upper space of the pressure control pool 11 is not less than 0.3. In this embodiment, the ratio of the volume of the upper space of the inner peripheral portion 16 to the total volume of the upper space of the pressure control pool 11 is 0.7, and the water level of the outer peripheral portion 15 is increased about 2.3 m.

Figure 4:
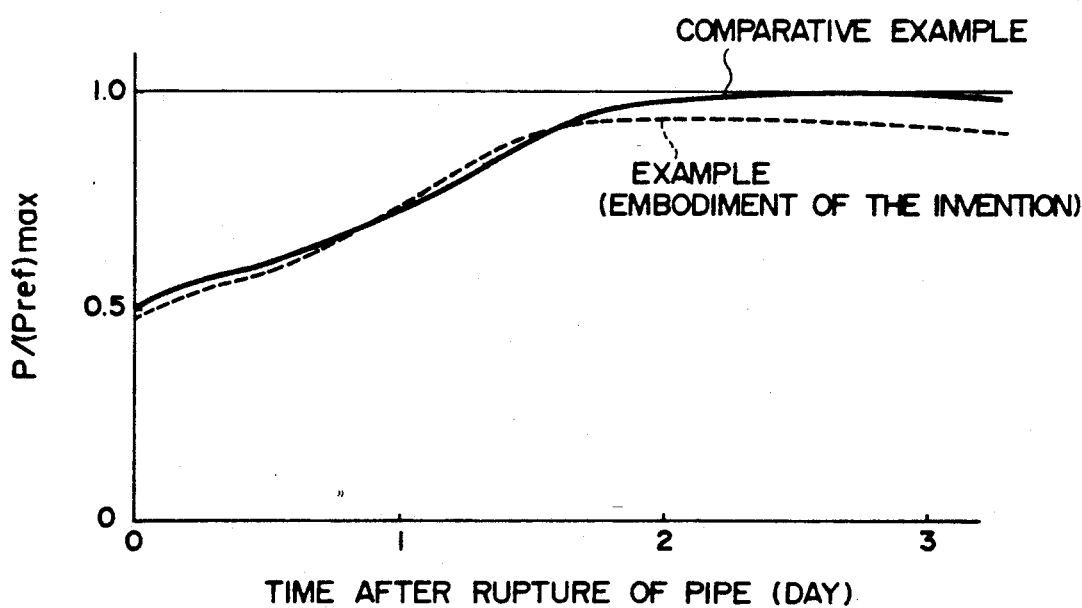
FIG. 4 is a graph showing a variation in the pressure within the reactor containment vessel of the 1st embodiment after the accident.

In this embodiment, when the accident occurs, the area of contact of the pool water of the pressure control pool 11 with the outer peripheral pool 17 through the reactor containment vessel wall 10 is increased, so that the amount of heat transferred from the pressure control pool 11 to the outer peripheral pool 17 is increased. In the case of the provision of the division wall 14 as in this embodiment, even when the volume of the gas phase portion of the pressure control pool 11 is large, the area of contact of the pool water of the pressure control pool 11 with the outer peripheral pool 17 can be sufficiently large. In this embodiment, the volume of the gas phase portion of the pressure control pool 11 is increased 25% higher than that obtained without the provision of the division wall 14. Variations in the pressure P within the reactor containment vessel of this embodiment are shown in FIG. 4 in comparison with a pressure Pref within a comparative reactor containment vessel without the division wall 14. As shown in FIG. 4, the maximum value of the pressure within the reactor containment vessel of this embodiment is about 0.4 kg/cm$^2$ lower. Instead of decreasing the maximum value of the pressure within the reactor containment vessel, the size of the containment vessel can be reduced so as to reduce the cost.

In this embodiment, the division wall 14 is welded to an upper wall 90 of the pressure control pool 11 to prevent any leakage between the inner and outer peripheral portions 16 and 15. In this embodiment, the distance or spacing between the division wall 14 and the reactor containment vessel wall 10 is about 1.5 m, and the welding operation can be easily done on the side of the outer peripheral portion 15.

Thus, in this embodiment, the following effects can be achieved. The decay heat, produced in the reactor core 2 in the event of the coolant losing accident, can be efficiently removed without the use of any dynamic equipment such as a pump. The maximum value of the pressure within the reactor containment vessel is about 0.4 kg/cm$^2$ lower, and alternatively if there is no need to decrease the maximum value of the pressure within the reactor containment vessel, the reactor containment vessel can be reduced in size since the reactor containment vessel has a good heat radiation performance.

Figure 5:
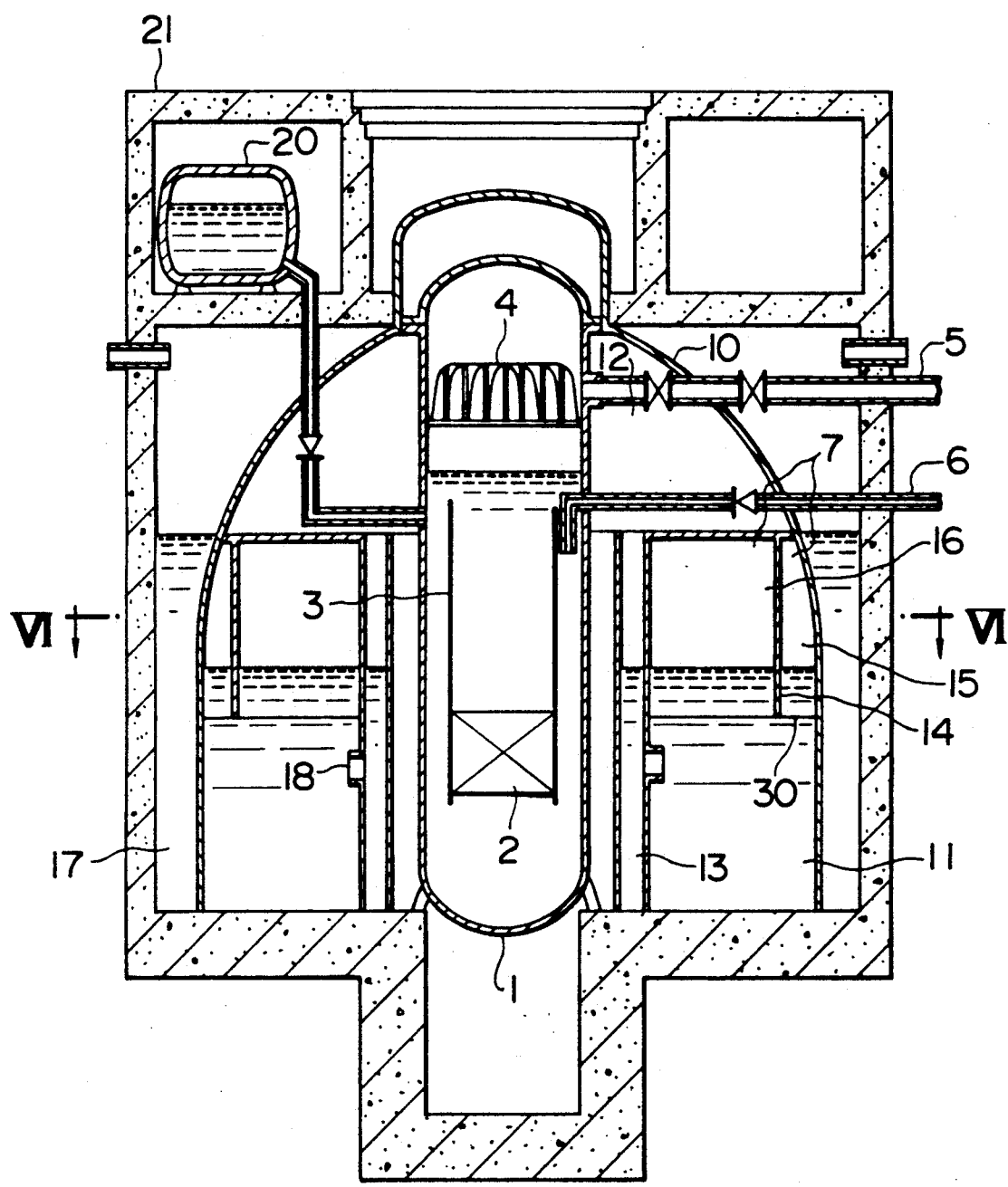
FIG. 5 is a vertical cross-sectional view of a 2nd embodiment of a reactor containment vessel of the invention.
Figure 6:
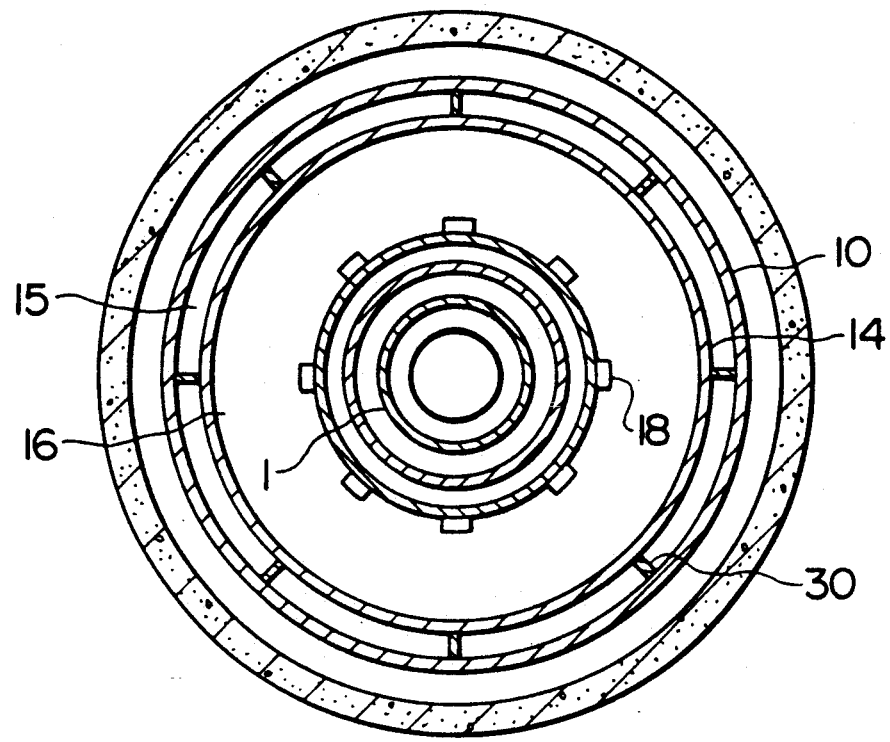
FIG. 6 is a cross-sectional view taken along the line VI—VI of FIG. 5.

A second embodiment of the invention will now be described with reference to FIGS. 5 and 6. FIG. 6 is a cross-sectional view taken along the line VI—VI of FIG. 5. This second embodiment differs from the embodiment of FIG. 1 in that a space between a division wall 14 (which is provided in an upper space (wet well 7) of a pressure control pool 11) and a reactor containment vessel wall 10 is circumferentially divided into a plurality of sections by partition plates 30. The other construction is the same as that of the first embodiment, and therefore explanation thereof is omitted.

In the second embodiment, the heat radiation performance of the reactor containment vessel is improved in the event of the coolant losing accident, as in the first embodiment. In addition, in the second embodiment, even if leakage should develop in the division wall 14, thus failing to maintain a pressure differential between an outer peripheral portion 15 and an inner peripheral portion 16, the water level in only one section of the divided outer peripheral portion 15 subjected to the leakage does not increase. Therefore, even in the event of such leakage, the area of contact of the pool water of the pressure control pool 11 with an outer peripheral pool 17 through the reactor containment vessel wall 10 can be kept sufficiently large, thus enhancing the reliability in the heat radiation performance of the reactor containment vessel.

Thus, in this embodiment, the following effects can be achieved. The decay heat, produced in the reactor core in the event of the coolant losing accident, can be efficiently removed without the use of any dynamic equipment such as a pump. And besides, even if leakage should develop in the division wall 14, this influence is small, thereby improving the reliability of the invention. The effect of radiation of the heat from the pressure control chamber to the outer peripheral pool 11 can be further improved by forming the division wall 14 and the partition plates 30 with a material of a good thermal-conductivity.

Figure 7:
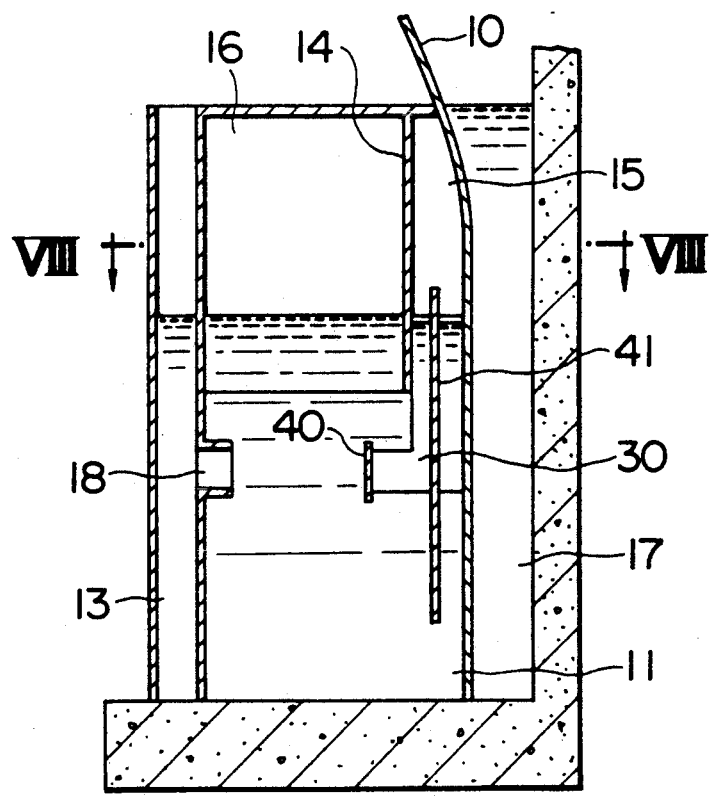
FIG. 7 is a vertical cross-sectional view of a portion of a 3rd embodiment of a reactor containment vessel of the invention, showing portions of a pressure control chamber and an outer peripheral pool.
Figure 8:
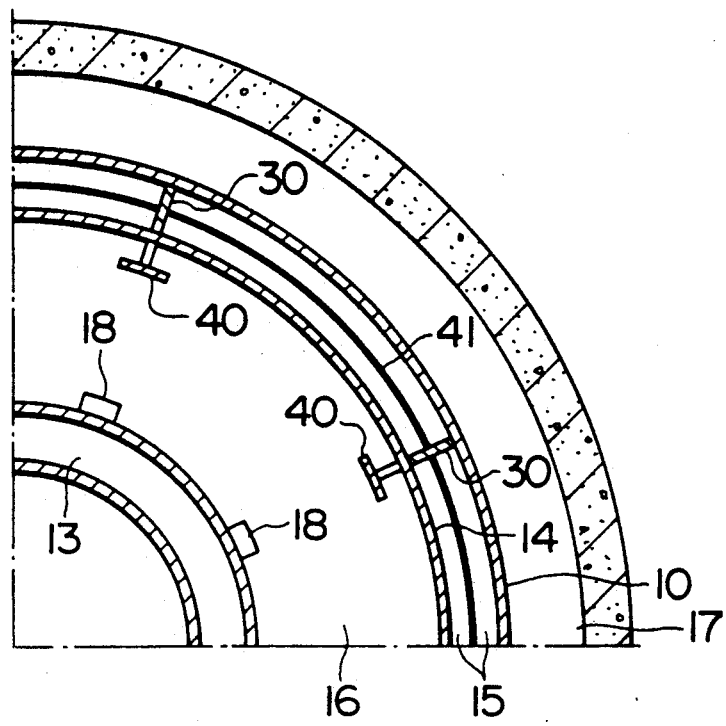
FIG. 8 is a cross-sectional view taken along the line VIII—VIII of FIG. 7, showing a quarter of the circumference.

A third embodiment of the invention will now be described with reference to FIGS. 7 and 8. FIG. 8 is a cross-sectional view taken along the line VIII—VIII of FIG. 7. This third embodiment differs from the embodiment of FIGS. 5 and 6 in that baffle plates 40 for preventing a horizontal movement of the gas fed from steam outlet ports 18 of a vent tube 13 are provided in an inner peripheral portion 16 of a pressure control pool 11, and in that a convection promoting plate 41 for promoting a natural circulation of the Water is provided in an outer peripheral portion 15 of the pressure control pool 11. Each partition plate 30 shown in FIGS. 5 and 6 is extended downwardly, and this downward extension is further extended horizontally toward the vent tube 13, and the baffle plate 40 is fixedly mounted on the distal end of this horizontal extension in opposed relation to the steam outlet port 18.

Thanks to the provision of the baffle plates 40, even when large bubbles abruptly flow from the steam outlet ports 18 of the vent tube 13 into the pressure control pool 11, the bubbles are prevented by the baffle plates 40 from moving horizontally, and therefore rise vertically due to buoyancy, so that the bubbles are accumulated in the upper space of the inner peripheral portion 16 without fail. This ensures the increase of the water level of the outer peripheral portion 15.

Figure 9:
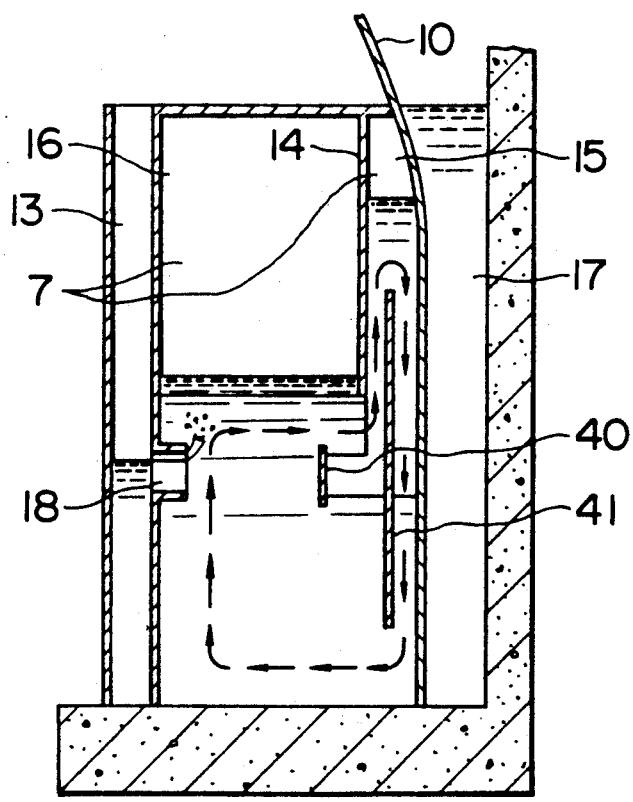
FIG. 9 is a view similar to FIG. 7, but indicating the flow of pressure control pool water by arrows in the event of an accident.

The convection promoting plate 41 is fixedly mounted on the partition plates 30 by welding, and is spaced from a division wall 14 and a reactor containment vessel wall 10 to form paths of flow of the pool water of the pressure control pool 11. The effects achieved by the provision of the convection promoting plate 41 will now be described with reference to FIG. 9. The water outside the convection promoting plate 41 is cooled by an outer peripheral pool 17 to be increased in density. Therefore, the convection is promoted by a natural circulating force (which is indicated by arrows) due to a difference in density between the water inside the convection promoting plate 41 and the water outside this plate 41, so that the temperature of the water in the pressure control pool 11 rapidly rises generally uniformly in upward and downward directions, as compared with the case where there is not provided the convection promoting plate 41. As a result, the efficiency of transfer of the heat from the pressure control pool 11 to the outer peripheral pool 17 becomes higher, so that the decay heat removal characteristics are further enhanced. In this embodiment, the maximum value of the pressure of the reactor containment vessel is about 0.45 kg/cm$^2$ lower than that achieved without the division wall 14 and the convection promoting plate 41.

Thus, in this embodiment, the following effects can be achieved. The decay heat, produced in the reactor core in the event of the coolant losing accident, can be efficiently removed without the use of any dynamic equipment such as a pump. Also, the maximum value of the pressure of the reactor containment vessel can be decreased about 0.45 kg/cm$^2$, or the reactor containment vessel can be reduced in size. Further, since the non-condensable gas is positively accumulated in the inner peripheral portion 16, the water level of the outer peripheral portion 15 can be efficiently increased, thereby enhancing the radiation of the heat from the reactor containment vessel to the outer peripheral pool 17.

Figure 10:
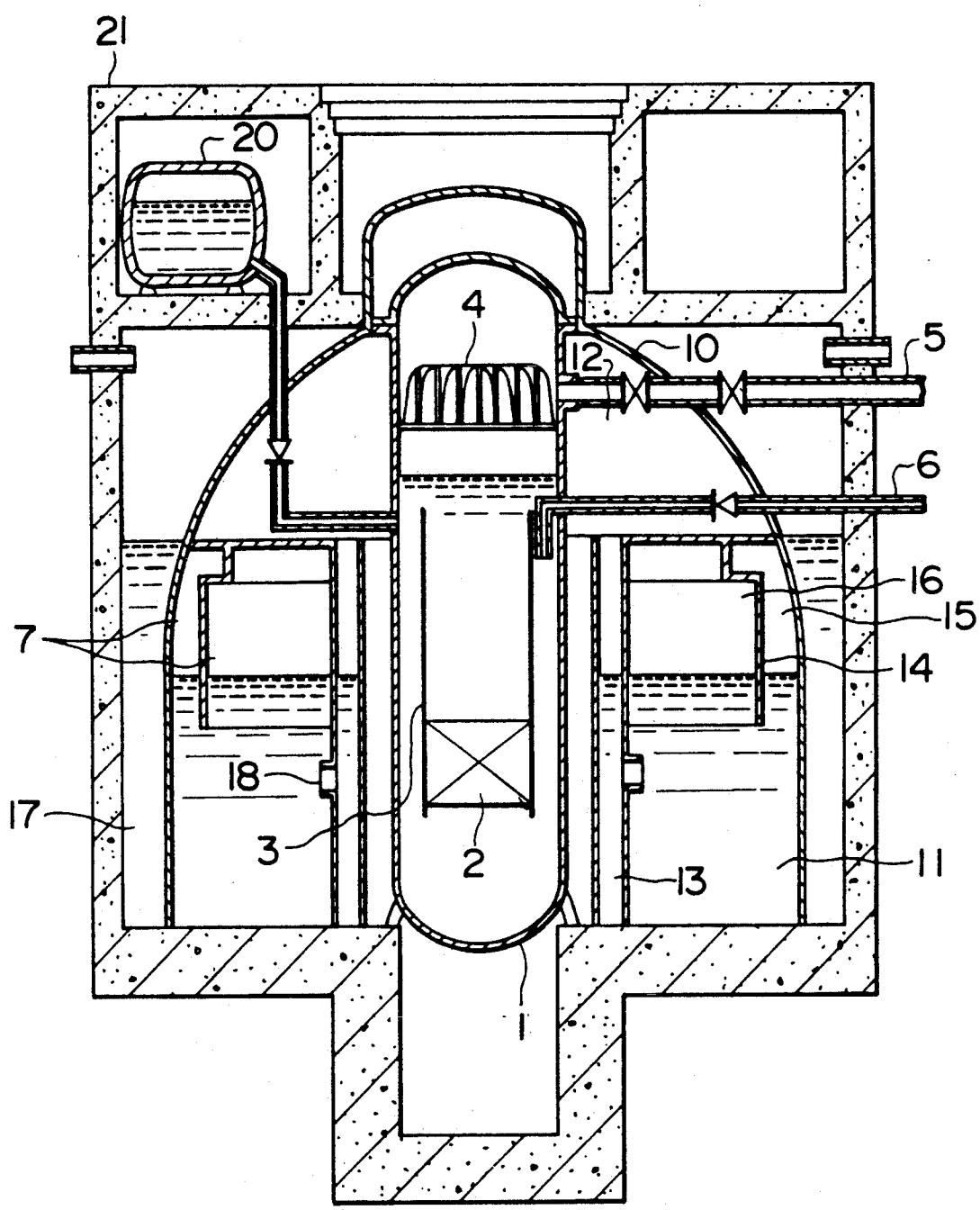
FIG. 10 is a vertical cross-sectional view of a 4th embodiment of a reactor containment vessel of the invention.

FIG. 10 shows a fourth embodiment of the invention. This embodiment differs from the embodiment of FIG. 1 in that a modified division wall 14 is used to increase the area of the flow path of an outer peripheral portion 15 of a pressure control pool 11 at its upper portion. The other construction is the same as that of the first embodiment, and therefore explanation thereof is omitted.

Figure 11C:
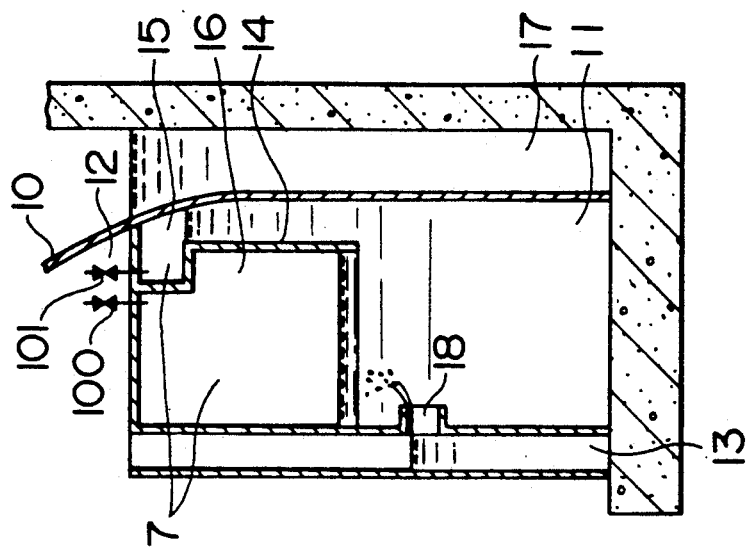
FIGS. 11A to 11C are vertical cross-sectional views of portions of a pressure control chamber and an outer peripheral pool of the 4th embodiment, showing the sequence of the operation from the normal condition to the condition of an accident.

The operation of this embodiment in the event of a coolant losing accident due to a rupture of a piping or the like will now be described with reference to FIG. 11. FIG. 11A shows the water level in a normal operation, and in this condition the water level of a vent tube 13 is the same as the water level of the pressure control pool 11. Incidentally, the cooling water is fed from a storage tank into the pressure control pool 11 by a pump before the reactor is activated, and at this time valves 100 and 101 are opened, so that all the water levels are the same. Thereafter, the valves 100 and 101 are closed.

Figure 11B:
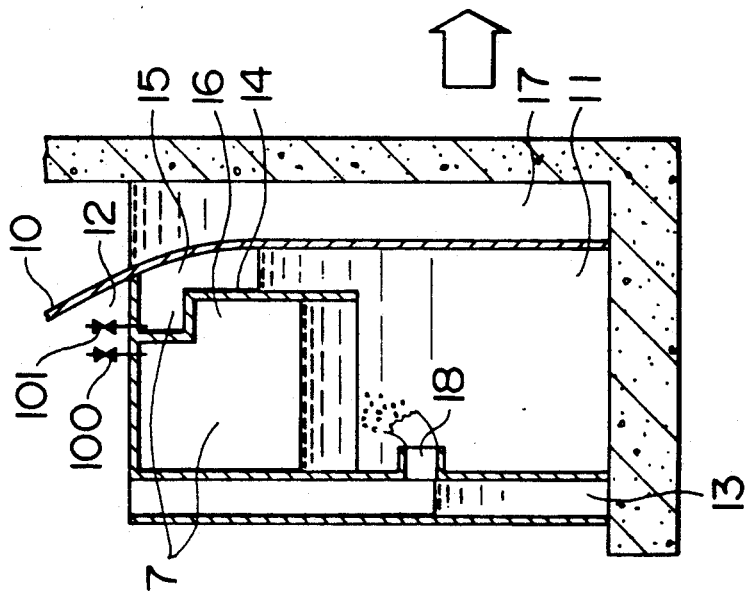
Figure 11A:
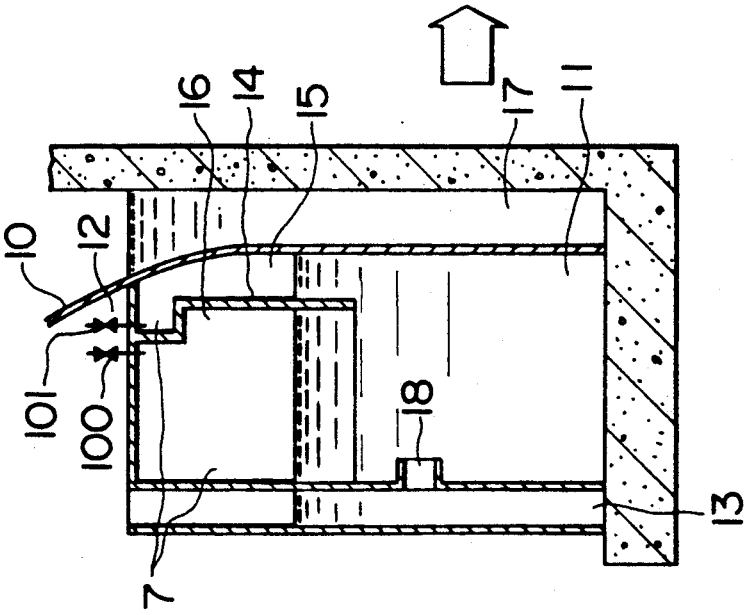

When a piping rupture accident occurs, the pressure within a dry well 12 increases, and the water level of the vent tube 13 decreases, so that the steam and nitrogen (non-condensable gas) in the dry well 12 flow into the pressure control pool 11, as shown in FIG. 11B. The steam thus introduced is condensed, but the nitrogen thus introduced rises due to buoyancy and is accumulated in an upper space of an inner peripheral portion 16. As a result, the partial pressure of the nitrogen accumulated in the inner peripheral portion 16 is higher than the partial pressure of the nitrogen in the outer peripheral portion 15, and therefore the water level of the inner peripheral portion 16 is decreased, so that the water level of the outer peripheral portion 15 increases. The nitrogen in the dry well 12 is all shifted into the steam space of the inner peripheral portion 16 in about five minutes, so that the water level difference between the inner peripheral portion 16 and the outer peripheral portion 15 becomes the maximum as shown in FIG. 11C.

Figure 12:
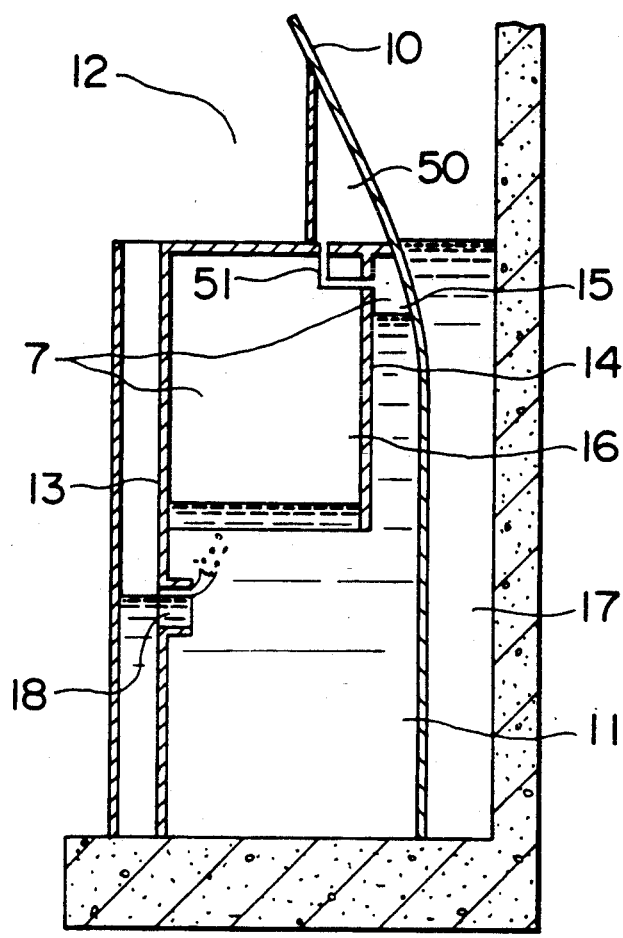
FIG. 12 is a vertical cross-sectional view of a portion of a 5th embodiment of a reactor containment vessel of the invention, showing portions of a pressure control chamber and an outer peripheral pool.
Figure 13:
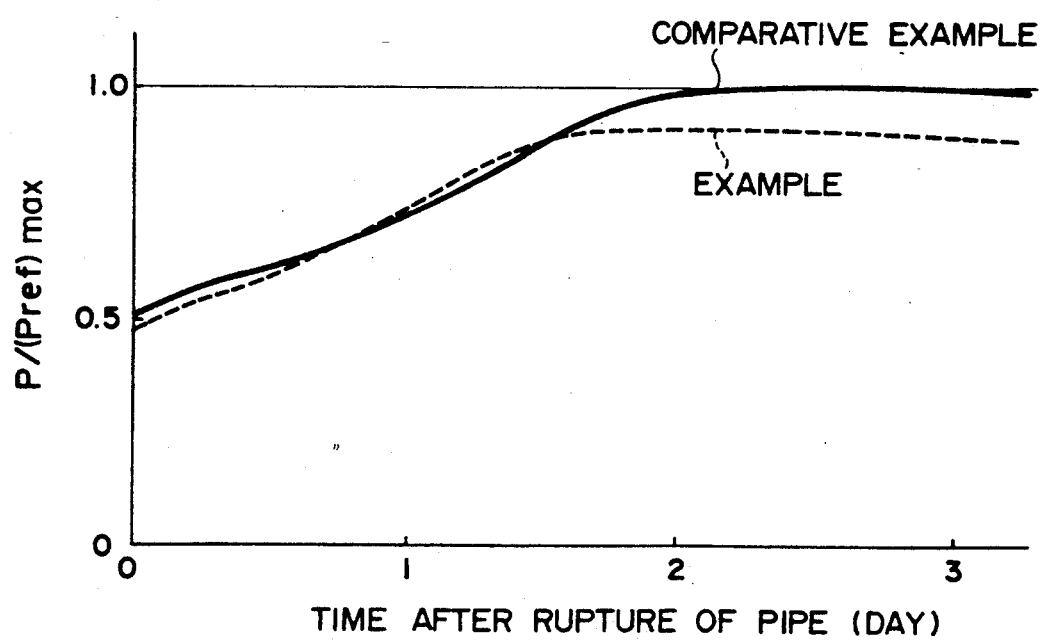
FIG. 13 is a graph showing a variation in the pressure within the reactor containment vessel of the 5th embodiment after the accident.

In the fourth embodiment, the volume of the upper space of the outer peripheral portion 15 is greater than that of the embodiment of FIG. 1, and the partial pressure of the nitrogen therein is decreased, and therefore the water level of the outer peripheral portion 15 is about 1.2 m higher than that of the embodiment of FIG. 1. Similar effects as achieved by the fourth embodiment can also be obtained by a fifth embodiment shown in FIG. 12 in which a container 50 is mounted on the inside of a reactor containment vessel wall 10, the container 50 receiving, via a pipe 51, the gas pressure in an upper space of an outer peripheral portion 15 of a pressure control pool 11. By virtue of the provision of the container 50, the volume ratio of the outer peripheral portion of a wet well 7 and its inner peripheral portion is substantially changed from 0.3 to 0.36. The natural convection heat transfer rate of the water in the pressure control pool 11 is higher than the condensation heat transfer rate of the steam including the non-condensable gas, and therefore the amount of transfer of the heat from the pressure control pool 11 to the outer peripheral pool 17 is increased. As a result, the maximum value of the pressure P within the reactor containment vessel of this embodiment (in which the above volume ratio is 0.36) is about 0.46 kg/cm$^2$ lower than that of a pressure Pref within a comparative reactor containment vessel without the division wall 14, as shown in FIG. 13. Instead of decreasing the maximum value of the pressure within the reactor containment vessel, the containment vessel can be reduced in size to reduce the cost.

Thus, in this embodiment, the following effects can be achieved. The decay heat, produced in the reactor core in the event of a coolant losing accident, can be efficiently removed without the use of any dynamic equipment such as a pump. Also, the maximum value of the pressure of the reactor containment vessel can be decreased about 0.46 kg/cm$^2$, or the reactor containment vessel can be reduced in size.

Figure 14:
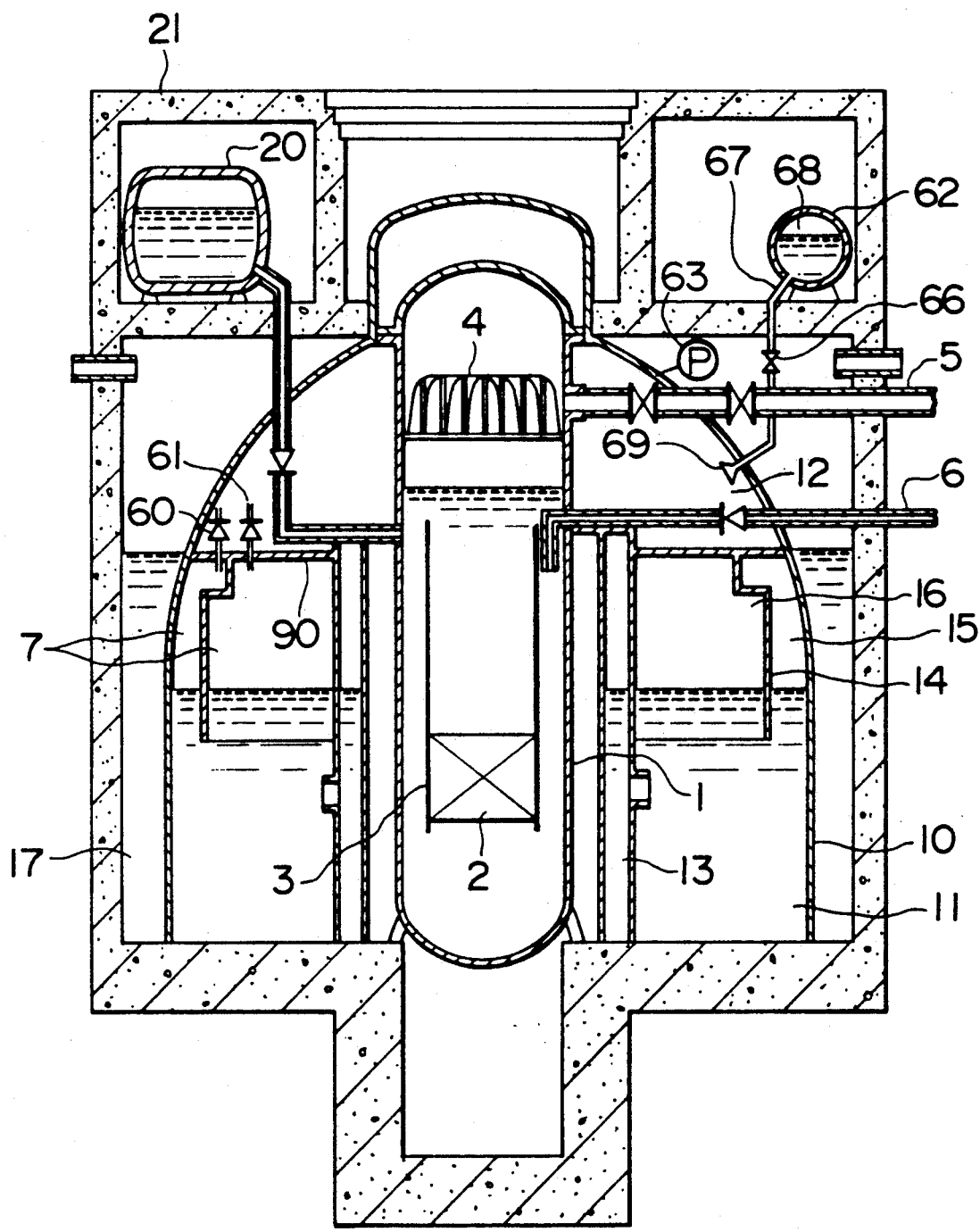
FIG. 14 is a vertical cross-sectional view of a 6th embodiment of a reactor containment vessel of the invention.

FIG. 14 shows a sixth embodiment of the invention. This embodiment differs from the embodiment of FIG. 10 in that a vacuum breaker 60 is used as means for communicating an upper space of an outer peripheral 15 with a dry well 12, and that a vacuum breaker 61 is used as means for communicating an upper space of an inner peripheral portion 16 with the dry well 12. The vacuum breaker 60 and 61 are mounted on a wall 90. The operating or working pressure of the vacuum breaker 60 is lower than that of the vacuum breaker 61 by an amount corresponding to a static head based on a water level difference between the inner and outer peripheral portions. A containment vessel spray tank 62 is mounted on a building 21, and is connected to a spray nozzle 69 via a pipe 67 and a valve 66, the spray nozzle 69 being disposed inside a reactor containment vessel wall 10. A pressure gauge 63 measures the pressure within the dry well 12, and feeds this measured value to a main controller 64 (not shown in FIG. 14). The other construction is the same as that of the fourth embodiment, and therefore explanation thereof is omitted.

Figure 15B:
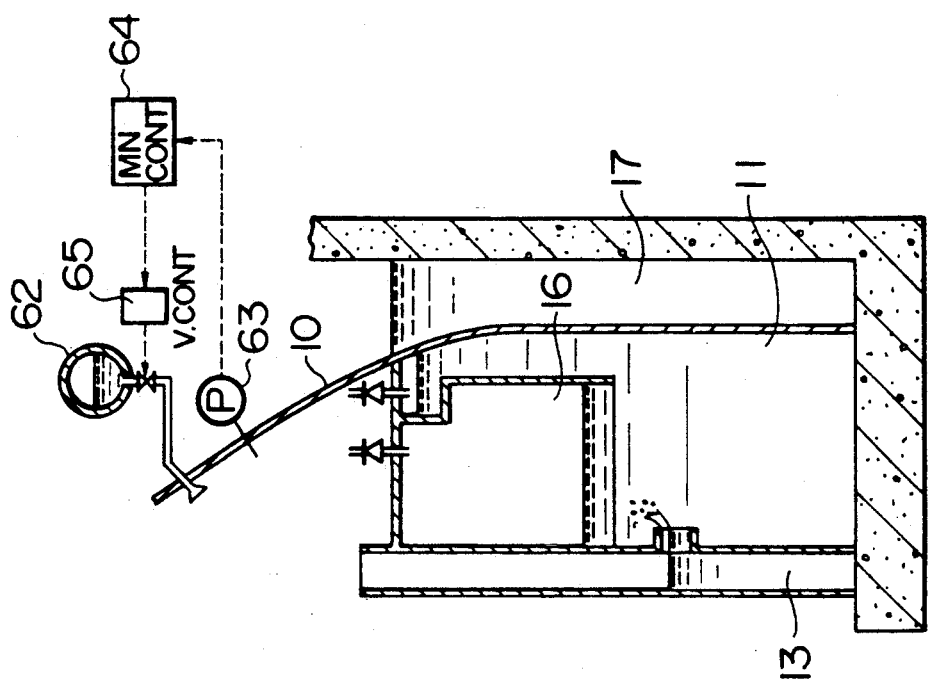
FIGS. 15A and 15B are vertical cross-sectional views of a portion of a 6th embodiment of a reactor containment vessel of the invention, showing portions of a pressure control chamber and an outer peripheral pool, and showing a variation in the water level after an accident.
Figure 15A:
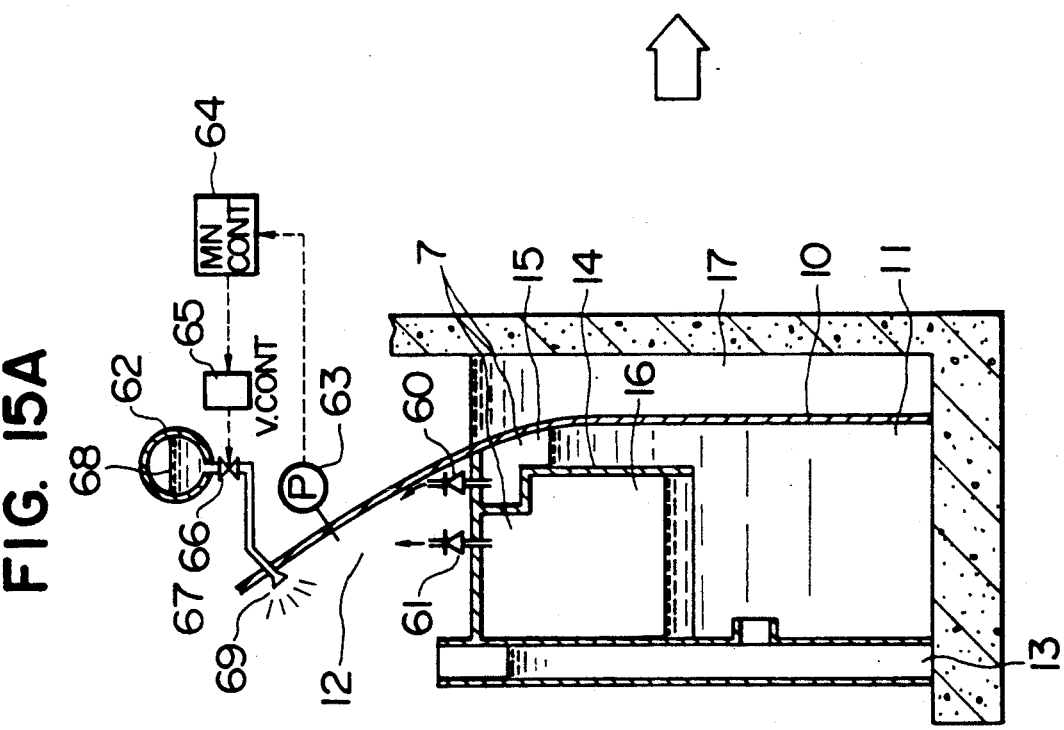

In the sixth embodiment, when a coolant losing accident due to a rupture of a main steam piping 5 occurs, the pressure within the dry well 12 increases. At this time, a signal for opening the valve 66 is fed from the main controller 64 to a valve control device 65 with a predetermined time delay (for example, 10 minutes) from the time when the pressure of the dry well 12 becomes 20% higher than the normal operation pressure, so that the valve 66 is opened for a predetermined time period (for example, 1 minute). The containment vessel spray tank 62 is beforehand pressurized, and feeds the coolant into the dry well 12 when the valve 66 is opened. As a result, the steam in the dry well 12 is condensed, and the pressure of the dry well 12 becomes lower than that of an upper space of a pressure control pool 11, so that the vacuum breakers 60 and 61 are operated substantially simultaneously, as shown in FIG. 15A. As a result of the operation of the vacuum breakers 60 and 61, the nitrogen partial pressures in the inner and outer peripheral portions 16 and 15 are decreased. An upper end of a vent tube 13 is higher than that of the embodiment of FIG. 10 for the purpose of positively preventing a reverse flow of the cooling water; however, depending on the operating pressures of the vacuum breakers 60 and 61, the vent tube 13 may be arranged in the same manner as in the embodiment of FIG. 10. When the containment vessel spray is stopped, the pressure of the dry well 12 again increases, and the steam and the nitrogen (non-condensable gas) in the dry well 12 again flow into the pressure control pool 11, as shown in FIG. 15B, and the nitrogen is accumulated in the inner peripheral portion 16. At this time, the pressure differential between the outer peripheral portion 15 and the inner peripheral portion 16 is greater than that obtained before the operation of the containment vessel spray, and therefore the water level of the outer peripheral portion 15 is further increased. As a result, the amount of transfer of the heat from the pressure control pool 11 to an outer peripheral pool 17 is increased, and the maximum value of the pressure within the containment vessel is about 0.5 kg/cm$^2$ lower that that achieved with a reactor containment vessel without the division wall 14 and the vacuum breakers 60 and 61. Instead of decreasing the maximum value of the pressure within the containment vessel, the containment vessel can be reduced in size to reduce the cost.

Thus, in the sixth embodiment, the following effects can be achieved. The decay heat, produced in the reactor core in the event of a coolant losing accident, can be efficiently removed without the use of any dynamic equipment such as a pump. Also, the maximum value of the pressure within the reactor containment vessel can be decreased about 0.5 kg/cm$^2$, or the reactor containment vessel can be reduced in size.

Figure 16A:
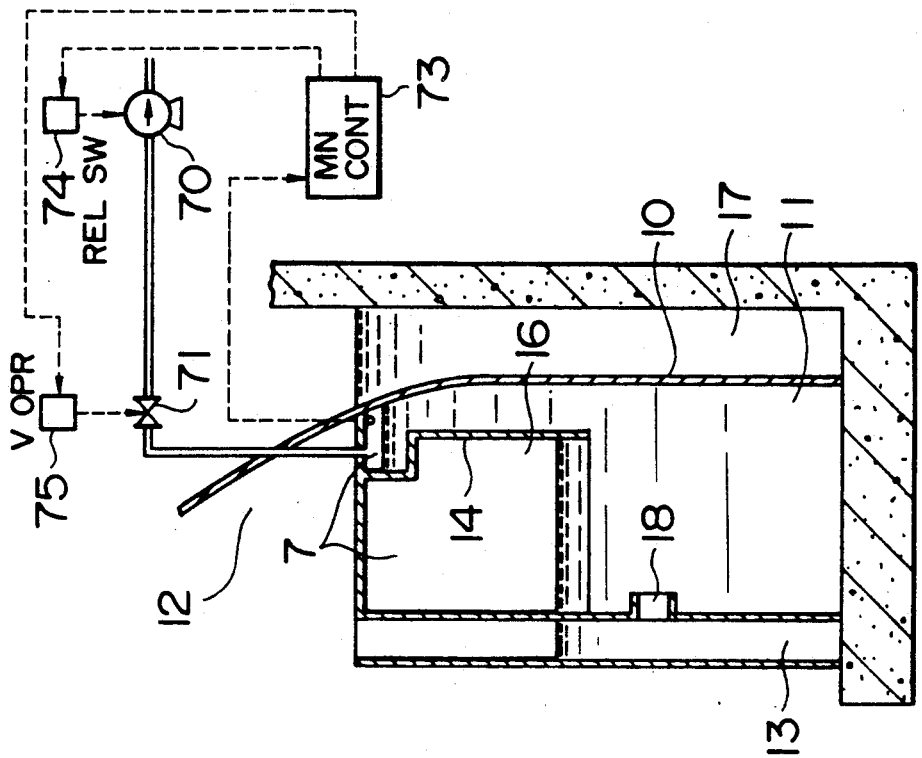
FIGS. 16A and 16B are vertical cross-sectional views of a portion of a 7th embodiment of a reactor containment vessel of the invention, showing portions of a pressure control chamber and an outer peripheral pool, and showing a variation in the water level of a pressure control pool before and after the activation of the reactor.

FIGS. 16A and B show a seventh embodiment of the invention. This embodiment differs from the embodiment of FIG. 10 in that the pressure within an outer peripheral portion 15 is rendered lower than the atmospheric pressure by the use of a vacuum pump 70. The other construction is the same as that of the sixth embodiment, and therefore explanation thereof is omitted.

Figure 16B:
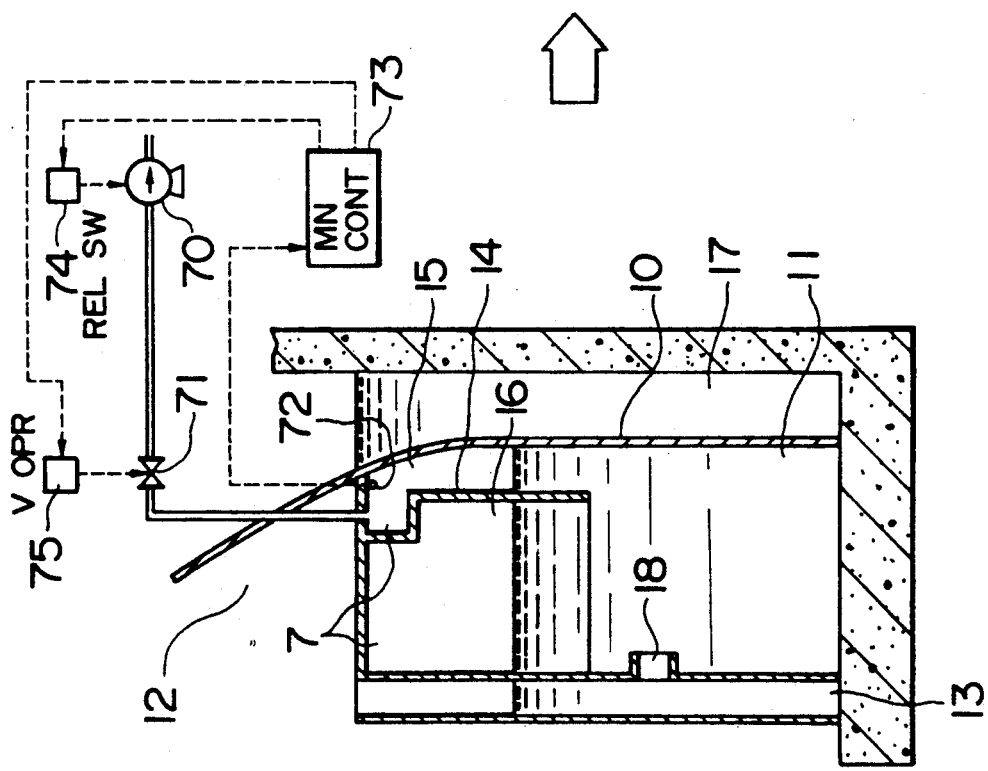

In the seventh embodiment, at the time of a periodic inspection or the like, as shown in FIG. 16A, the water levels of inner and outer peripheral portions 16 and 15 of a pressure control pool 11 are equal to each other, as in the embodiment of FIG. 10; however, before activating the reactor, the pressure of the outer peripheral portion 15 is rendered lower than the atmospheric pressure, thereby increasing the water level of the outer peripheral portion 15 about 4.5 m, as shown in FIG. 16B. A method of increasing this water level will now be described specifically. A relay switch 74, when receiving a signal from a main controller 73, is operated to operate the vacuum pump 70. Then, a valve operating device 75, when receiving a signal from the main controller 73, is operated to open a valve 71. As a result, the pressure within the outer peripheral portion 15 is decreased, so that the water level of the outer peripheral portion 15 is gradually increased. The water level of the outer peripheral portion 15 is measured by an ultrasonic water level gauge 72, and its measured value is fed to the main controller 73. When the water level of the outer peripheral portion 15 reaches a predetermined level (for example, rises 4.5 m), the valve operating device 75 is operated by the signal from the main controller 73 to close the valve 71. Further, the relay switch 74 is operated by the signal from the main controller 73 to stop the vacuum pump 70. The water level of the outer peripheral portion 15 may, of course, be measured by a differential pressure gauge. In the event of a coolant losing accident, the pressure differential between the inner and outer peripheral portions 16 and 15 is further increased, and the water level of the outer peripheral portion 15 is increased, so that the outer peripheral portion 15 is almost fully filled with the cooling water. As a result, the amount of transfer of the heat from the pressure control pool 11 to an outer peripheral pool 17 is increased, and the maximum value of the pressure within the reactor containment vessel is 0.55 kg/cm² lower than that achieved with a reactor containment vessel without the division wall 14. Instead of decreasing the maximum value of the pressure within the reactor containment vessel, the reactor containment vessel can be reduced in size to reduce the cost.

Thus, in this embodiment, the following effects can be achieved. The decay heat, produced in the reactor core in the event of a coolant losing accident, can be efficiently removed without the use of any dynamic equipment such as a pump. Also, the maximum value of the pressure of the reactor containment vessel can be decreased about 0.55 kg/cm², or the reactor containment vessel can be reduced in size.

FIGS. 17A and 17B show an eighth embodiment of the invention. This embodiment differs from the embodiment of FIG. 1 in that a container 85 holding cooling water and non-condensable gas (e.g. the air) is provided adjacent to an outer peripheral pool 17, the lower portion of the container 85 being open to the water in the outer peripheral pool 17. The other construction is the same as that of the first embodiment, and therefore explanation thereof is omitted.

In the eighth embodiment, a method of causing the container 85 to hold the cooling water and the non-condensable gas will now be described with reference to FIGS. 17A and B. The cooling water is supplied by a pump (not shown) from a storage tank (not shown) to the outer peripheral pool 17, and at this time a valve 82 is opened. By doing so, the water levels of the container 85 and the outer peripheral pool 17 rise in such a manner that these two water levels are kept equal to each other, as shown in FIG. 17A. The water level of the container 85 is measured by an ultrasonic water level gauge 81, and its measured value is fed to a main controller 80. When the water level of the container 85 reaches a predetermined level, for example, 8 m higher than the lower end of the container 85, a signal is fed from the main controller 80 to a valve operating device 83 to close the valve 82. As shown in FIG. 17B, the water level of the outer peripheral pool 17 is made equal to the water level of a pressure control pool 11. When the water level of the outer peripheral pool 17 is thus the same as the water level of the pressure control pool 11, loads acting respectively on the outer and inner sides of a reactor containment vessel wall 10 are equal to each other, and therefore the soundness of the reactor containment vessel wall 10 is enhanced, and also limitations on the construction are relieved. The operation in the event of a coolant losing accident will now be described with reference to FIGS. 18A and B. The steam flown into a dry well 12 flows, together with the non-condensable gas, into the pressure control pool 11 via a vent tube 13, so that the temperature of the cooling water in the pressure control pool 11 rises, and at the same time the water level of an outer peripheral portion 15 is increased. Due to heat transfer through the reactor containment vessel wall 10, the temperature of the cooling water in the outer peripheral pool 17 and the container 85 also rises. The pressure within the container 85 is the sum of the gas partial pressure and the steam partial pressure, and is higher than the atmospheric pressure. Therefore, because of a communicating tube action, the water level of the container 85 decreases whereas the water level of the outer peripheral pool 17 increases, as shown in FIG. 18A. The temperature of the cooling water in the outer peripheral pool 17 is saturated at about 100° C., and as shown in FIG. 18B, the water level of the outer peripheral pool 17 becomes the maximum and reaches the upper end of the pressure control pool 11. As a result, the area of effective heat transfer between the pressure control pool 11 and the outer peripheral pool 17 is increased, thereby enhancing the decay heat removal characteristics.

In this embodiment, the following effects can be achieved. During the normal operation, the loads acting respectively on the inner and outer sides of the reactor containment vessel wall 10 are equal to each other, and therefore the soundness of the containment vessel wall 10 is enhanced, and also the limitations on the construction are relieved. Further, in the event of the coolant losing accident, the area of effective heat transfer between the pressure control pool 11 and the outer peripheral pool 17 is increased to enhance the decay heat removal characteristics.

Figure 19:
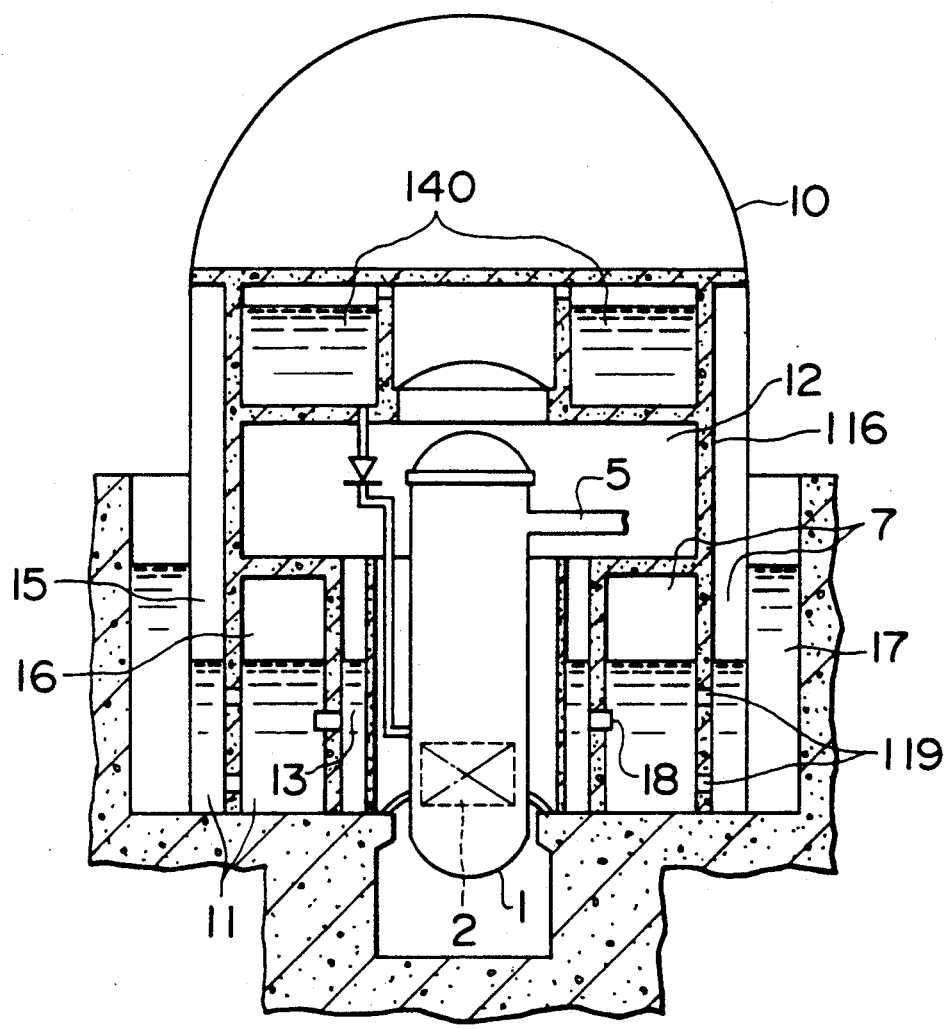
FIG. 19 is a vertical cross-sectional view of a 9th embodiment of a reactor containment vessel of the invention.

FIG. 19 shows a ninth embodiment of the invention. In the embodiments hereinafter described with reference to FIGS. 19 to 32, reactor containment vessels of the invention are applied to a large-size pump-containing boiling-water reactor (ABWR) having a electric power of 1,350 MW. Provided within a reactor containment vessel wall 10 of steel are a reactor pressure vessel 1 containing a reactor core 2, a pressure control pool 11 for condensing steam of high temperature and pressure emitted from the reactor pressure vessel 1 via a ruptured portion (opening) in the event of a piping rupture accident, a vent tube 13 for guiding the steam, emitted to a dry well 12, into the pressure control pool 11, and an emergency reactor core cooling water pool 140. A pressure control chamber includes the pressure control pool 11, outlet ports 18 for flowing the steam from the vent tube 13 to the pressure control pool 11, and a wet well 7. The wet well 7 is divided by a structural wall 116 of reinforce concrete into an outer peripheral portion 15 and an inner peripheral portion 16. The outer peripheral portion 15 is in contact with the reactor containment vessel wall 10, and the inner peripheral portion 16 is spaced away from the reactor containment vessel wall 10. The structural wall 116 dividing the pressure control chamber has a plurality of vertically-spaced upper and lower communication holes 119 communicating the inner and outer peripheral portions 16 and 15 of the pressure control pool 11 with each other, the communication holes 119 being disposed below the water surface of the pressure control pool 11. With this arrangement, the pool water can be freely circulated through the inner and outer peripheral portions 16 and 15 via the communication holes 119. The lower portion of the outer periphery of the reactor containment vessel wall 10 is disposed in contact with an outer peripheral pool 17.

In the reactor of this construction, in the event of a coolant losing accident caused by a rupture of a piping such as a main steam piping 5, the coolant in the reactor pressure vessel 1 flows, as the steam of high temperature and pressure, into the dry well 12 through the ruptured portion, so that the pressure of the dry well 12 is increased. When the pressure of the dry well 12 increases, the water level of the vent tube 13 decreases, and when this water level goes below the steam outlet ports 18, the steam in the dry well 12 and nitrogen (non-condensable gas) within the reactor containment vessel wall 10 simultaneously flow from the dry well 12 into the pressure control pool 11. The steam is condensed by the pool water of the pressure control pool 11, but the nitrogen is not condensed and rises to be accumulated in the inner peripheral portion 16 of the wet well 7. To facilitate the accumulation of the nitrogen gas in the inner peripheral portion 16, the steam outlet ports 18 are open at the innermost periphery of the inner peripheral portion 16. As a result, the nitrogen partial pressure in the inner peripheral portion 16 of the wet well becomes higher than the nitrogen partial pressure in the outer peripheral portion 15, and a water level difference corresponding to this pressure difference develops, so that the water level of the outer peripheral portion 15 becomes higher than that of the inner peripheral portion 16. According to results of analysis of the coolant losing accidents, the nitrogen in the dry well 12 are all shifted into the inner peripheral portion 16 of the wet well 7 in about 5 minutes, and at this time the water lever difference between the inner and outer peripheral portions 16 and 15 is the maximum, so that the area of effective transfer of the heat to the outer peripheral pool 17 via the reactor containment vessel wall 10 is increased. Since this embodiment is related to the large-size reactor containment installation, the structure wall 116 of reinforce concrete is provided at the inner side of the reactor containment vessel to support the weight of the reactor, and the reactor containment vessel wall 10 of steel having a good thermal conductivity is provided at the outermost periphery of the reactor containment vessel, thus meeting both the structural requirement for the large-size reactor containment vessel and the heat radiation requirement.

In this embodiment, as the area of contact of the pressure control pool 11 with the outer peripheral pool 17 through the reactor containment vessel wall 10 increases, the amount of transfer of the heat from the pressure control pool 11 to the outer peripheral pool 17 increases. Another path of heat radiation from the reactor containment vessel wall 10 of steel is a path from the wet well 7 to the outer peripheral pool 17. Generally, as the partial pressure of the non-condensable gas becomes lower whereas the pressure of the steam becomes higher, the condensation heat transfer rate becomes higher, and the amount of heat radiation per unit area becomes greater. The partial pressure of the non-condensable gas in the outer peripheral portion 15 of the wet well can be kept lower in the present invention as compared with the case where the wet well 7 of the pressure control chamber is not divided, and therefore the present invention is also advantageous from th viewpoint of the heat radiation due to the condensation heat transfer. Instead of reducing the maximum value of the pressure within the reactor containment vessel, the reactor containment vessel can be reduced in size to reduce the cost.

Thus, in this embodiment, even with respect to the large-size reactor containment vessel, the decay heat, produced in the reactor core in the event of a coolant losing accident, can be efficiently removed without the use of any dynamic equipment such as a pump.

Figure 20:
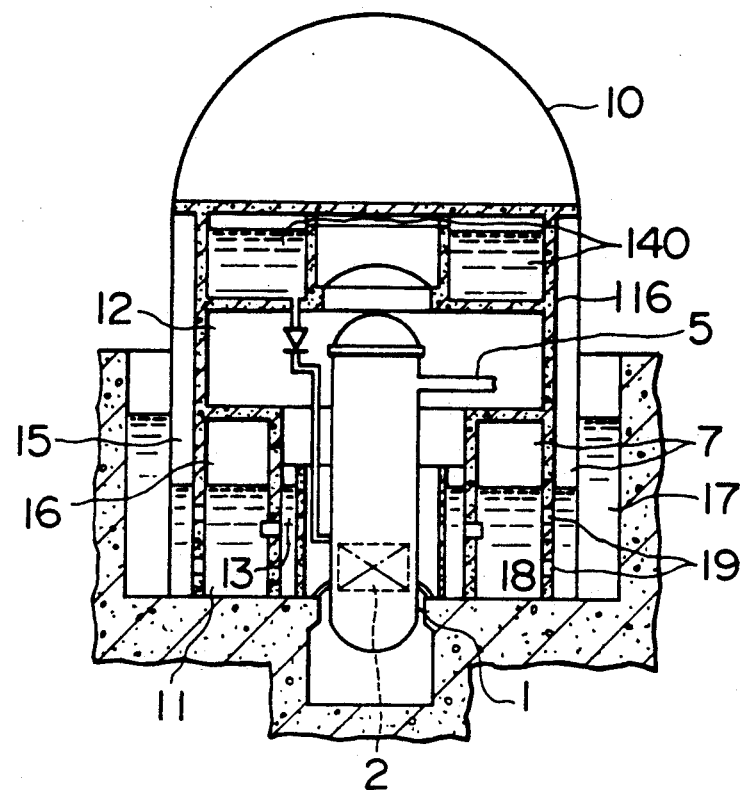
FIG. 20 is a vertical cross-sectional view of a 10th embodiment of a reactor containment vessel of the invention.

FIG. 20 shows a tenth embodiment of the invention. This embodiment differs from the embodiment of FIG. 19 in that an upper end (inlet) of a vent tube 13 is lower than an upper end of a pressure control chamber, and is higher than steam outlet ports 18 of the vent tube 13. The other construction is the same as that of the ninth embodiment, and therefore explanation thereof is omitted.

In this embodiment, in the event of a coolant losing accident, in order to remove decay heat after a reactor core 2 is stopped, cooling water is fed by the gravity from an emergency reactor core cooling water pool 140 into a reactor pressure vessel 1 containing the reactor core 2. The cooling water, after submerging the reactor core 2, overflows from the ruptured portion of the piping to fill in a lower dry well. Then, the water level of the lower dry well reaches the level of the upper end of the vent tube 13, so that the cooling water flows into a pressure control pool 11 through the vent tube 13. As a result the water level of the pressure control pool 11 increases, so that its heat transfer area in contact with an outer peripheral pool 17 is increased. In this embodiment, since the upper end of the vent tube 13 is lower than the upper end of the pressure control chamber, the flowing of the cooling water into the pressure control pool 11 can advantageously be started earlier. The method of keeping the water level of the pressure control pool 11 low during the normal operation and of increasing this water level for a long cooling period after the occurrence of a coolant losing accident also provides the following advantages. As described above, the amount of radiation of the heat from the reactor containment vessel can be increased by increasing the pool water level to increase the heat transfer area. However, the following limitations are imposed on the height of a wet well 7 of the pressure control chamber. Namely, immediately after the accident, the water surface of the pressure control pool 11 is abruptly ascended by a large amount of gas flown from the dry well 12 (This phenomenon is referred to as "pool swell"). At this time, when the water surface violently impinges on the upper wall of the wet well 7 of the pressure control chamber, a large dynamic load is applied thereto, which leads to a possibility that the structure may be damaged or broken. For this reason, it is necessary that the space portion of the wet well 7 should has a sufficient height to avoid such pool swell (At least, this height should be 1.5 times greater than the depth of water of steam outlet ports 18 of the vent tube 13). However, if the height of the space portion of the wet well 7 is thus increased, the reactor containment vessel is naturally increased in size. Another possible method of avoiding the pool swell is to reduce the depth of water of the steam outlet ports 18 of the vent tube 13. In this case, as described above, there is encountered a problem that the area of the effective heat transfer is reduced due to the thermal stratification phenomenon in the pool. Therefore, the method of keeping the water level of the pressure control pool 11 low during the normal operation and of increasing this water level for a long cooling period after the occurrence of a coolant losing accident is very advantageous in that it can avoid the pool swell immediately after the accident and can also increase the heat transfer area during the long cooling period.

Figure 21:
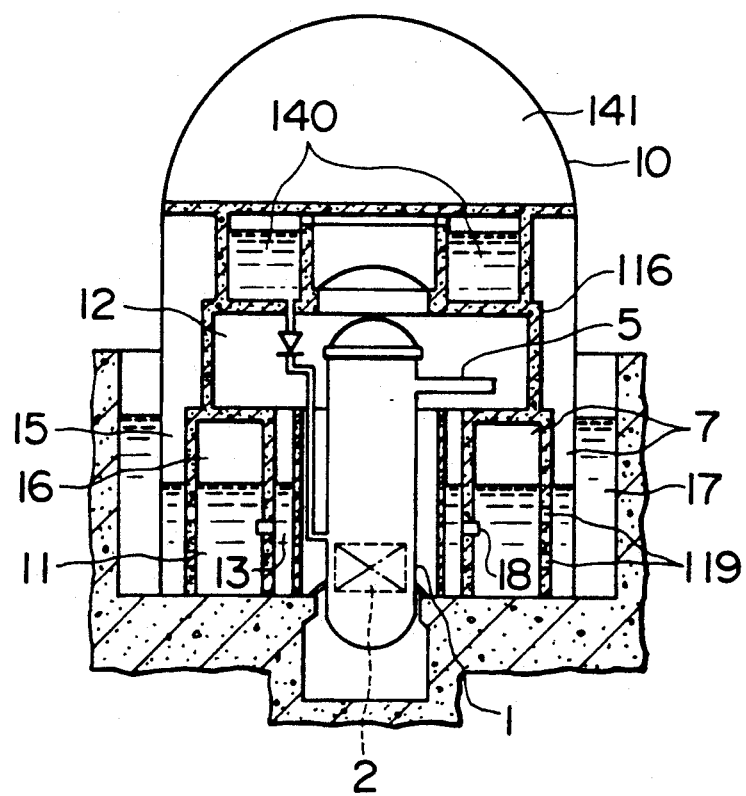
FIG. 21 is a vertical cross-sectional view of a 11th embodiment of a reactor containment vessel of the invention.

FIG. 21 shows an eleventh embodiment of the invention. This embodiment differs from the embodiment of FIG. 19 in that the area of a flow path of an upper portion of an outer peripheral portion 15 of a pressure control pool 11 is increased toward its upper end. The other construction is the same as that of the ninth embodiment, and therefore explanation thereof is omitted.

In the eleventh embodiment, due to a pressure differential between the outer and inner peripheral portions 15 and 16 of the wet well, the water level of the outer peripheral portion 15 is increased at a higher rate at an initial stage of the pressure variation. If the same amount of non-condensable gas flows into the wet well of the inner peripheral portion 16, the water level of the outer peripheral portion 15 increases at a higher rate as compared with the case where the outer peripheral portion 15 has a uniform cross-sectional area throughout the height thereof. Therefore, in this embodiment, the area of contact of the pressure control pool water with a reactor containment vessel wall 10 is increased, thereby enhancing the heat radiation effect of the reactor containment vessel.

Figure 22:
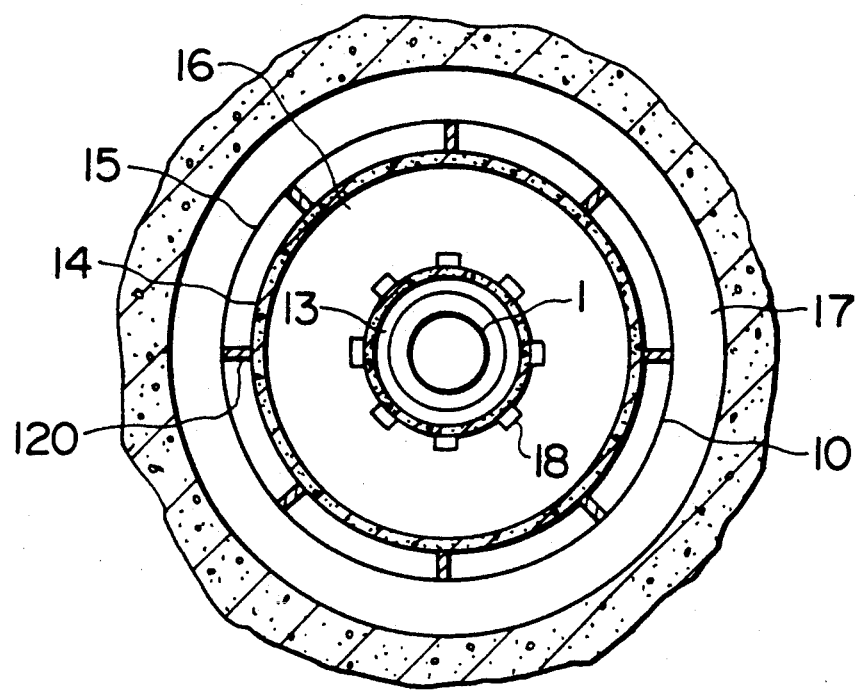
FIG. 22 is a horizontal cross-sectional view of a 12th embodiment of a reactor containment vessel of the invention, taken along the water level of a pressure control pool.

FIG. 22 shows a twelfth embodiment of the invention. FIG. 22 is a horizontal cross-sectional view in which a reactor containment vessel wall 10 of steel is cut along a horizontal plane including a wet well 7. This embodiment differs from the ninth embodiment of FIG. 19 in that a space between that portion of a structural wall 116 disposed at an upper space of a pressure control pool 11 and the reactor containment vessel wall 10 of steel is circumferentially divided by partition plates 120 into a plurality of sections. The other construction is the same as that of the ninth embodiment, and therefore explanation thereof is omitted.

Figure 23:
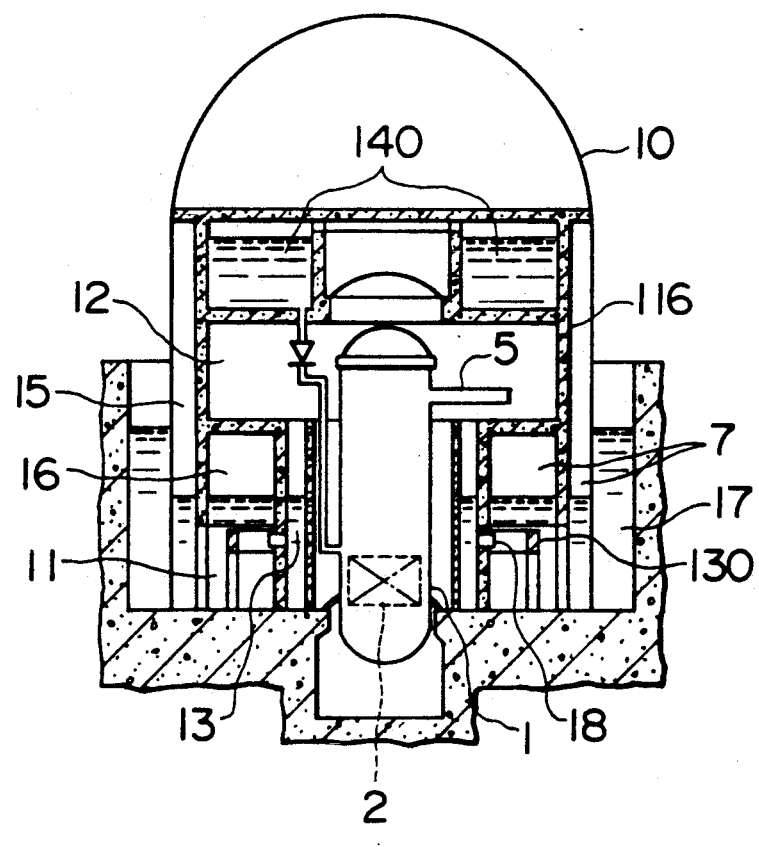
FIG. 23 is a vertical cross-sectional view of a 13th embodiment of a reactor containment vessel of the invention.
Figure 24:
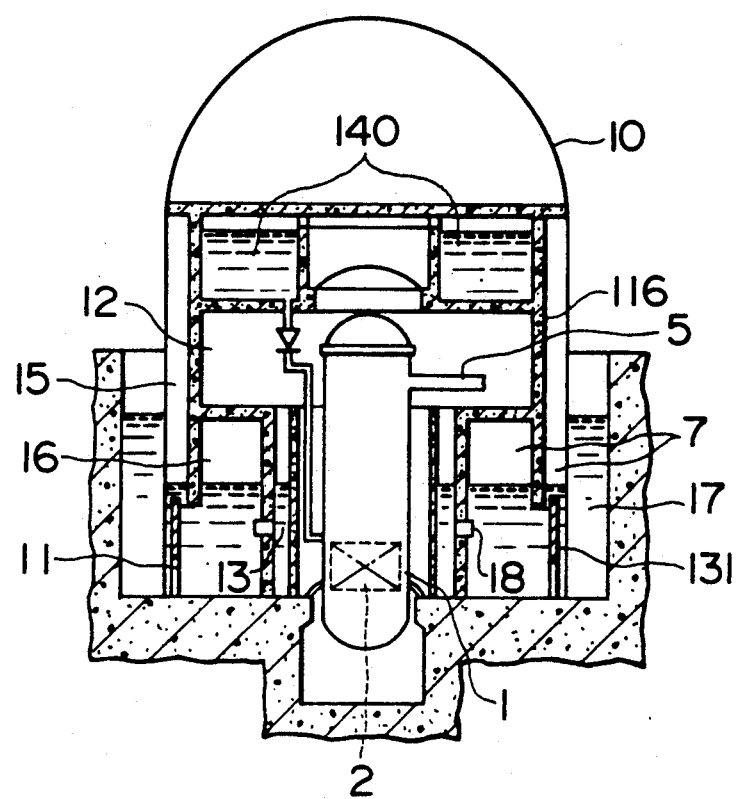
FIG. 24 is a vertical cross-sectional view of a 14th embodiment of a reactor containment vessel of the invention.

In the twelfth embodiment, in the event of a coolant losing accident, the water level of an outer peripheral portion 15 increases to enhance the effect of transfer of the heat to an outer peripheral pool 17, as described above for the embodiment of FIG. 19. Even if a gas leakage should develop in the structural wall 116, thus failing to maintain a pressure differential between the outer and inner peripheral portions 15 and 16, the water level in only one of the space sections of the outer peripheral portion 15 related to the leakage does not increases, because the wet well of the outer peripheral portion 15 is circumferentially divided by the partition plates 120. The water level in the other space sections can be kept increased, thus keeping the reduction of the effective heat transfer area as small as possible. Therefore, the reliability of the means for decreasing the pressure within the reactor containment vessel by enhanced heat radiation from the FIG. 23 shows a thirteenth embodiment of the invention, and FIG. 24 shows a fourteenth embodiment of the invention. The embodiments of FIGS. 23 and 24 differ from the embodiment of FIG. 19 in that a large proportion of that portion of a structural wall 116 disposed below the water level of a pressure control pool 11 is removed, the structural wall 116 dividing a pressure control chamber. With this arrangement, the pool water can be circulated more freely. Further, in the thirteenth embodiment of FIG. 23, baffle plates 130 for preventing a horizontal movement of the gas fed from a vent tube 13 are provided in an inner peripheral portion 16 of the pressure control pool 11. Thanks to the provision of the baffle plates 130, even when large bubbles abruptly flow from steam outlet ports 18 of the vent tube 13 into the pressure control pool 11, the bubbles are prevented by the baffle plates 130 from moving horizontally, and therefore rise vertically due to buoyancy, so that the bubbles are accumulated in the upper space of the inner peripheral portion 16 without fail. Therefore, the water level of an outer peripheral portion 15 can be increased positively and efficiently.

Figure 25:
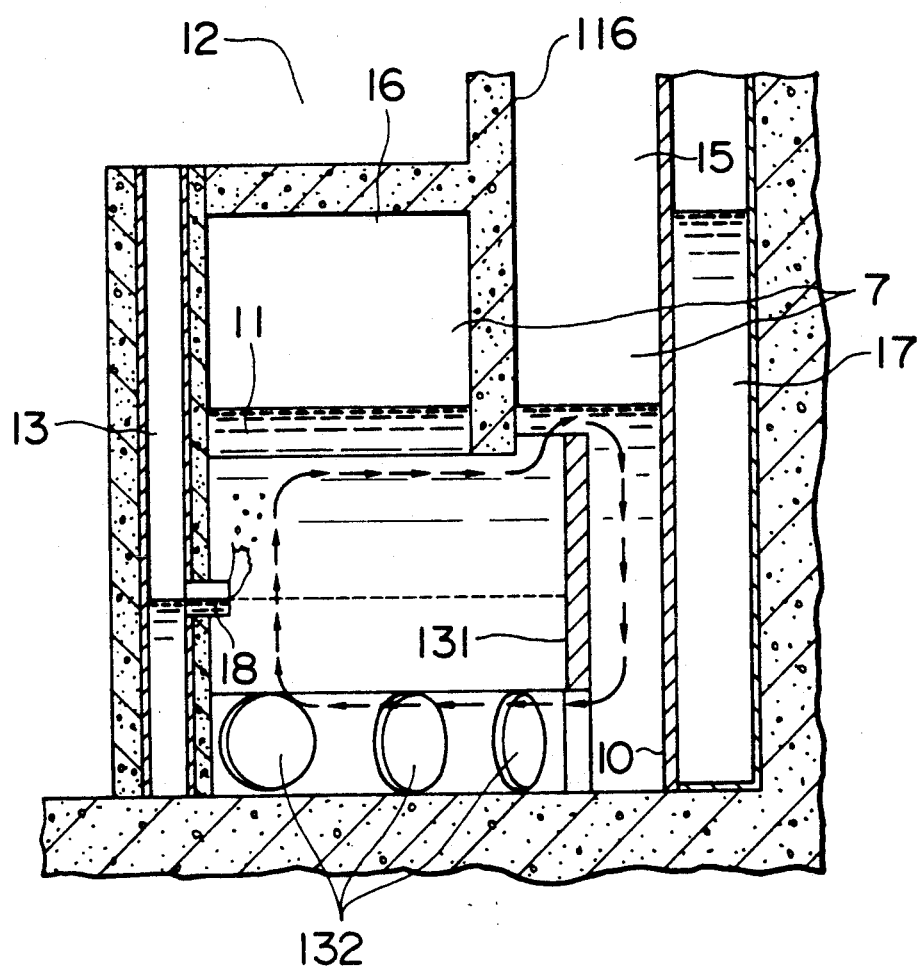
FIG. 25 is a vertical cross-sectional view of a portion of the 14th embodiment, showing portions of a pressure control chamber and an outer peripheral pool, and indicating the flow of pressure control pool water by arrows in the event of an accident.

In the fourteenth embodiment of FIG. 24, a convection promoting plate 131 for promoting a natural circulation of the water is provided in the outer peripheral portion 15 of the pressure control pool 11. In this case, a vertical long space between the convection promoting plate 131 with communication holes 132 and a reactor containment vessel wall 10 constitutes a path of downward flow of the pool water of the pressure control pool 11, thereby causing a convection as indicated by arrows in FIG. 25. With this convection, the pool water of relatively high temperature tending to be stagnant in the upper portion can be caused to positively move along the convection promoting plate 131 to reach the bottom of the pressure control pool 11, so that the region of the high-temperature pool water is spread upwardly and downwardly, thereby increasing the amount of radiation of the heat to an outer peripheral pool 17. Further, the region of the pool water of a relatively low temperature disposed below a broken line indicated in FIG. 25 is stirred by the high-temperature pool water, and therefore the temperature increase of the pool water at the upper portion is suppressed, thereby preventing a reduction of the ability of condensing the steam. Also, in this embodiment, the deterioration of the heat radiation characteristics due to the thermal stratification of the pool water in the pressure control pool 11 can be avoided. The effect of lowering the thermal stratification interface can be achieved without being much influenced by the height of the steam outlet ports of the vent tube. Therefore, the depth of water of the steam outlet ports of the vent tube can be shallower as compared with a conventional construction, thereby reducing the blowing pressure of steam into the pool to decrease the pressure within the reactor containment vessel.

The other construction of each of the thirteenth and fourteenth embodiments is the same as that of the ninth embodiment, and therefore explanation thereof is omitted.

Figure 26:
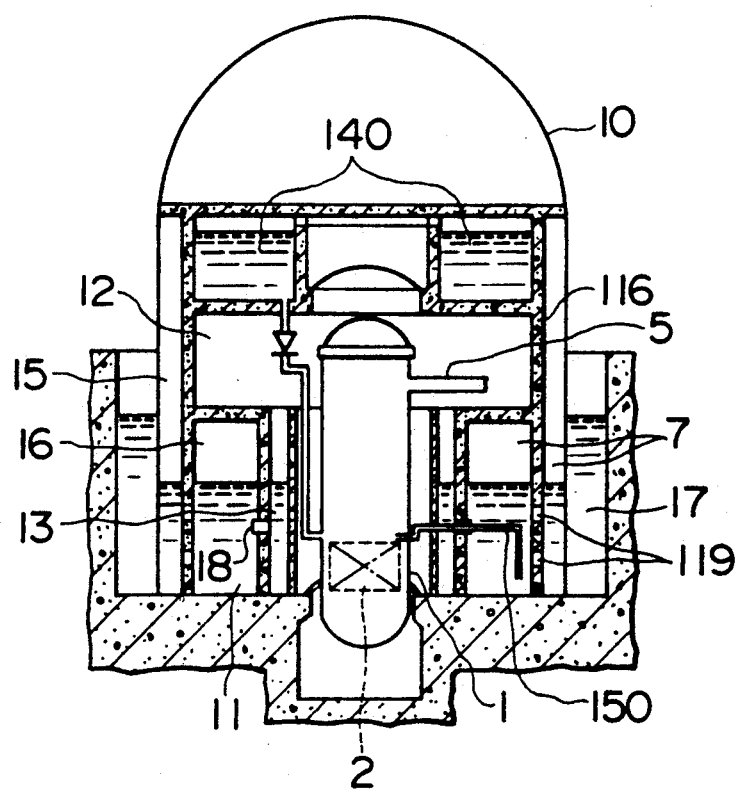
FIG. 26 is a vertical cross-sectional view of a 15th embodiment of a reactor containment vessel of the invention.

FIG. 26 shows a fifteenth embodiment of the invention. This embodiment differs from the ninth embodiment of FIG. 19 in that an opening (inlet) of a reactor core-submerging pipe 150 disposed in a pressure control pool 11 is disposed adjacent to the bottom of the pressure control pool 11 which is below steam outlet ports 18 of a vent tube 13. With this arrangement, the stagnant water of low temperature at the lower portion of the pool is fed through the reactor core-submerging pipe 150 into a pressure vessel 1 by a siphoning action, thereby cooling a reactor core 2. The other construction is the same as that of the ninth embodiment, and therefore explanation thereof is omitted.

In the fifteenth embodiment, the heat removal effect becomes greater due to the sensible heat of the cooling water as compared with the case where the high-temperature water at the upper portion of the pool is used to cool the reactor core 2. Therefore, the efficiency of cooling of the reactor core 2 is enhanced. When during a long cooling period after an accident, it is intended to remove the decay heat (produced in the reactor core 2) by evaporating the cooling water poured via the reactor core-submerging pipe 150, the required amount of the cooling water, though varied depending on the output of the reactor core, is about 1,000 tons for one day from the stop of the reactor, and about 2,400 tons for three days from the stop of the reactor, in the case where the electric power is 1,350 MW. The low-temperature water of such an amount is pumped from the lower portion of the pool, and removes the heat of the reactor core 2, and then is returned, in the form of steam, to the upper portion of the pool where the steam is condensed into high-temperature water. Therefore, the thermal stratification interface (i.e., the boundary surface between the high-temperature region and the low-temperature region) moves downward, so that the high-temperature heat transfer region effective for the heat transfer is advantageously increased. Further, the cooling water fed to the reactor core 2 from the reactor core-submerging pipe 150 is returned to the pressure control pool 11, and therefore there is no need to supply cooling water from the outside, and the heat of the reactor core 2 can be removed continuously.

Figure 27:
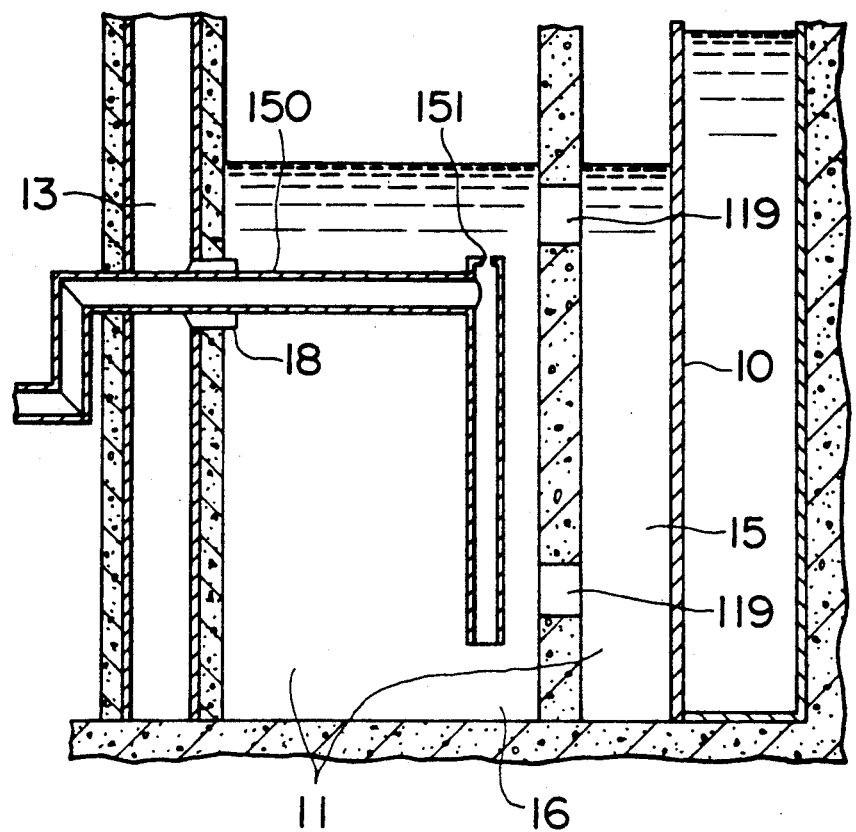
FIG. 27 is a vertical cross-sectional view of a portion of a 16th embodiment of a reactor containment vessel of the invention, showing a reactor core-submerging pipe (which is an improved form of a reactor core-submerging pipe in the 15th embodiment) and its surroundings.

A sixteenth embodiment of the invention is directed to an improved form of the reactor core-submerging pipe of the fifteenth embodiment, and FIG. 27 shows the improved reactor core-submerging pipe 150 in detail. The other construction is the same as that of the ninth embodiment, and therefore explanation thereof is omitted.

The improved reactor core-submerging pipe 150 is disposed below the water surface of a pressure control pool 11, and constitutes a siphon between the pressure control pool 11 and a reactor core 2. If gas should flow into the reactor core-submerging pipe 150 to interrupt the continuous flow of the liquid through the pipe 150, this pipe fails to act as a siphon and therefore fails to maintain the cooling of the reactor core 2. To overcome this difficulty, in this embodiment, an opening 151 is provided in the uppermost portion of the reactor core-submerging pipe 150. With this arrangement, even if the gas should flow into the reactor core-submerging pipe 150, the gas is discharged into the water through the opening 151 at the uppermost portion because of buoyancy, so that the siphoning function is recovered, thus enhancing the reliability of the submerging system.

Figure 28:
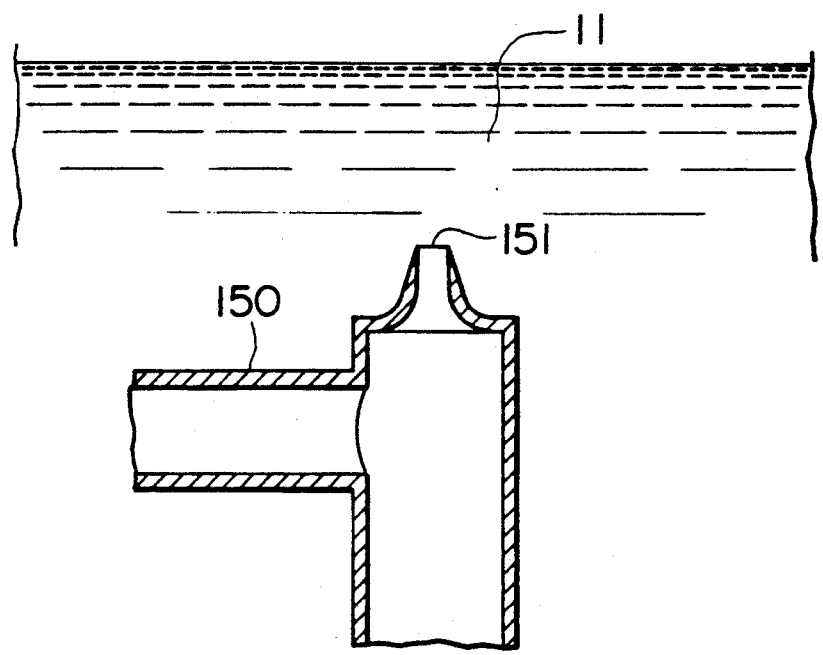
FIG. 28 is a vertical cross-sectional view of a portion of a 17th embodiment of a reactor containment vessel, showing a reactor core-submerging pipe which is an improved form of the reactor core-submerging pipe in the 16th embodiment.

A seventeenth embodiment of the invention is directed to an improved form of the reactor core-submerging pipe 150 of the sixteenth embodiment, and FIG. 28 shows this improved reactor core-submerging pipe 150 in detail. The other construction is the same as that of the ninth embodiment, and therefore explanation thereof is omitted.

In the seventeenth embodiment, an opening 151 provided at the uppermost portion of the reactor core-submerging pipe 150 becomes narrower toward its upper end, as shown in FIG. 28. With this arrangement, the flow resistance coefficient when the fluid flows into the reactor core-submerging pipe is much greater than the flow resistance coefficient when the fluid flows out of the reactor core-submerging pipe. The area of the opening 151 is smaller than the area of a liquid inlet (lower open end) of the reactor core-submerging pipe 150 disposed in a pressure control pool 11, and the flow resistance coefficient when the liquid flows into the opening 151 is large, and therefore the amount of the pool water flowing into the reactor core-submerging pipe 150 via the opening 151 is small. Therefore, the low-temperature water can be pumped from the bottom portion of the pressure control pool 11 to submerge a reactor core 2. This enhances the effect of cooling of the reactor core 2.

Figure 29:
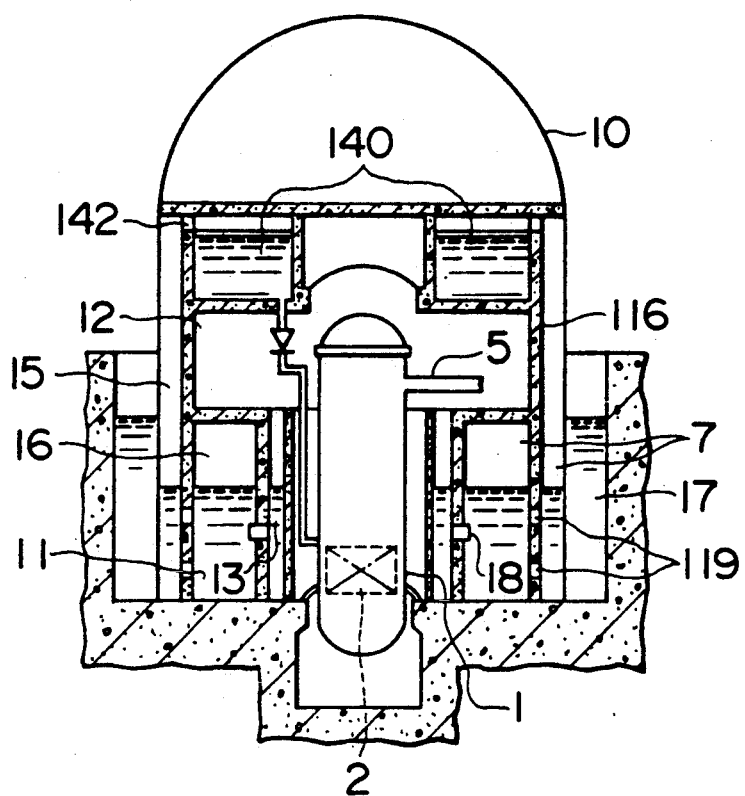
FIG. 29 is a vertical cross-sectional view of a 18th embodiment of a reactor containment vessel of the invention.

FIG. 29 shows an eighteenth embodiment of the invention.

In FIG. 29, a wet well 7 is in communication with an upper space of an emergency reactor core cooling water pool 140 via a communication hole 142. The other construction is the same as that of the seventh embodiment, and therefore explanation thereof is omitted.

In this embodiment, in addition to the advantageous effects of the ninth embodiment, the following effects can be achieved. As the water level of an outer peripheral portion 15 increases, non-condensable gas in a wet well of the outer peripheral portion 15 is dispersed into the upper space of the emergency reactor core cooling water pool 140 via the communication hole 142 to decrease the pressure, thereby decreasing the overall pressure of the reactor containment vessel. Further, since the water surface of the outer peripheral portion 15 becomes higher, the heat radiation performance of the reactor containment vessel is enhanced.

Figure 30:
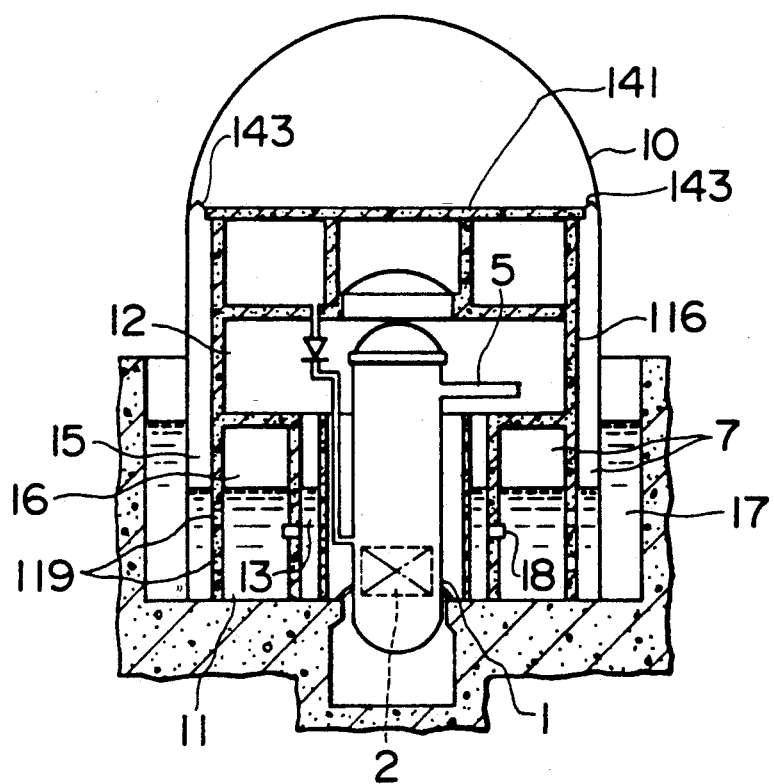
FIG. 30 is a vertical cross-sectional view of a 19th embodiment of a reactor containment vessel of the invention.

FIG. 30 shows a nineteenth embodiment of the invention.

In FIG. 30, an operation floor 141 is communicatable with a wet well 7 of an outer peripheral portion 15 by a pressure release valve 143. The other construction is the same as that of the ninth embodiment, and therefore explanation thereof is omitted.

In this embodiment, in addition to the advantageous effects of the ninth embodiment, the following effects can be achieved. When as a result of the increase of the water surface of the outer peripheral portion 15, the pressure within the wet well 7 of the outer peripheral portion 15 reaches a set value for activating the releasing operation of the pressure release valve 143, the pressure release valve 143 is opened, so that the upper space of the operation floor 141 within the reactor containment vessel can be used as a wet well for the outer peripheral portion, which serves to reduce the partial pressure of the non-condensable gas in the wet well. By changing the set pressure of the pressure release valve 143, the time of initiation of the operation of the pressure release valve 143 can be arbitrarily set. A rupture disk is used as the pressure release valve 143.

Figure 31:
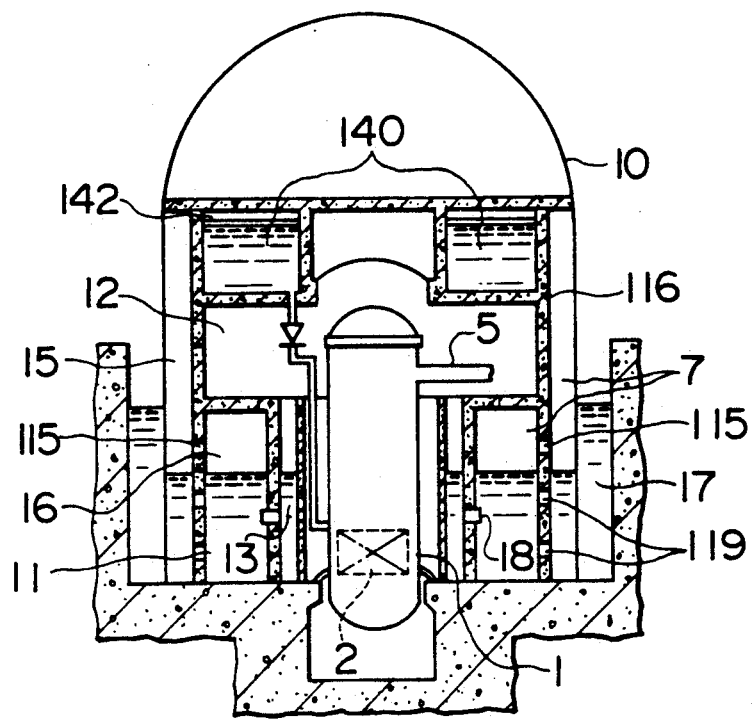
FIG. 31 is a vertical cross-sectional view of a 20th embodiment of a reactor containment vessel of the invention.

FIG. 31 shows a twentieth embodiment of the invention.

In this embodiment, a communication hole 115 communicating wet wells of outer and inner peripheral portions 15 and 16 with each other is formed through a structural wall 116 dividing a pressure control chamber. The other construction is the same as that of the ninth embodiment, and therefore explanation thereof is omitted.

In this embodiment, the non-condensable gas, introduced into a pressure control pool 11 at the time of an accident, is dissipated to the whole of the inner and outer portions of the wet well 7 via the communication hole 115 in the structural wall 116, and is also dissipated to a gas phase portion of a emergency reactor core cooling water pool 140 via a communication hole 142. Therefore, the pressure within the reactor containment vessel can be reduced by such dissipation.

Figure 32:
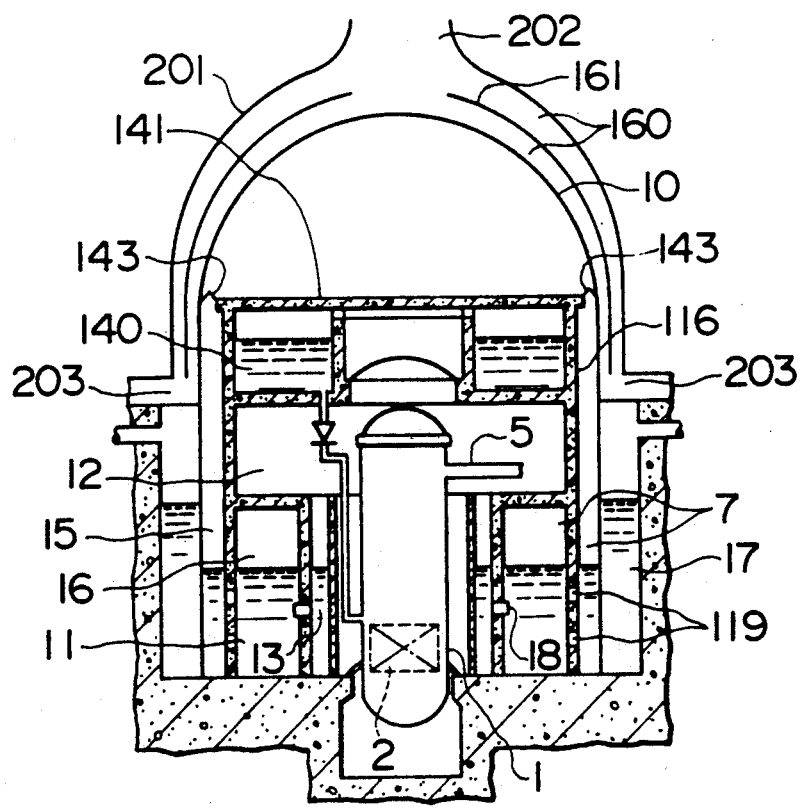
FIG. 32 is a vertical cross-sectional view of a 21st embodiment of a reactor containment vessel of the invention.

FIG. 32 shows a twenty-first embodiment of the invention.

In this embodiment, a pressure release valve 143 is provided between an operation floor 141 and a wet well 7, and that portion of a reactor containment vessel wall 10 disposed above an outer peripheral pool 17 is covered with a dome-shaped wall 201. A vent outlet 202 is provided at the upper end of the wall 201, and vent inlets 203 are provided at the lower end of the wall 201. Formed between the reactor containment vessel wall 10 and the wall 201 is a space 160 which is capable of causing a natural draft because of the vent inlets 203 and the vent outlet 202. A radiator plate (partition wall) 161 made of a material of a good thermal conductivity is mounted within the space 160 in spaced relation to the reactor containment vessel wall 10 and the wall 201. The other construction of this embodiment is the same as that of the ninth embodiment, and therefore explanation thereof is omitted.

In addition to the advantageous effects of the ninth embodiment, this embodiment achieves the following effects. When the pressure within an outer peripheral portion 15 increases as a result of a piping rupture accident, the pressure release valve 143 is finally opened. As a result, the atmosphere of high temperature and pressure in the outer peripheral portion 15 is dispersed into the upper space of the operation floor 141 of the reactor containment vessel, so that the temperature of the operation floor 141 increases to the same level as the temperature of a wet well 7. The air in the space 160 is warmed by the temperature of the operation floor 141 within the reactor containment vessel wall 10, and the thus warmed air in the space 160 rises, thus producing a natural draft flowing from the vent inlets 203 to the vent outlet 202. This natural draft serves to remove the heat from the reactor containment vessel wall 10, thereby decreasing the temperature and pressure within the reactor containment vessel.

Particularly, the radiator plate 161 receives the radiation heat from the reactor containment vessel wall 10 to deprive this wall 10 of the heat, and the thus deprived heat is removed by drafts of the air flowing on the opposite sides of the radiator plate 161. Therefore, the radiator plate 161 serves to enhance the effect of cooling of the reactor containment vessel.

Thus, the upper portion of the reactor containment vessel is cooled by the air, and the lower portion thereof is cooled by the water as in the embodiment of FIG. 19, and the cooling effect on the whole of the reactor containment vessel is enhanced. This suppresses the increase of the pressure within the reactor containment vessel.

What is claimed is:

1. A reactor containment vessel comprising an internal structural wall provided within said reactor containment vessel, said internal structural wall constituting a dry well portion for containing a reactor pressure vessel, and an inner peripheral portion of a pressure control chamber for condensing steam in said dry well portion, said internal structural wall being surrounded by said reactor containment vessel of steel in such a manner that said internal structural wall is spaced from a reactor containment vessel wall to form an outer peripheral portion of said pressure control chamber, said reactor containment vessel being disposed in an outer peripheral pool, said inner and outer peripheral portions having respective pressure control pool portions and respective wet well portions disposed above said pressure control pool portions, said pressure control pool portions of said inner and outer peripheral portions being communicated with each other, and said wet well portions of said inner and outer peripheral portions being separated from each other.

2. A reactor containment vessel comprising an internal structural wall provided within said reactor containment vessel, said internal structural wall constituting a dry well portion for containing a reactor pressure vessel, and an inner peripheral portion of a pressure control chamber for condensing steam in said dry well portion, said internal structure wall being surrounded by said reactor containment vessel of steel in such a manner that said internal structural wall is spaced from a reactor containment vessel wall to form an outer peripheral portion of said pressure control chamber, said reactor containment vessel being disposed in an outer peripheral pool, said inner and outer peripheral portions having respective pressure control pool portions and respective wet well portions disposed above said pressure control pool portions, said pressure control pool portions of said inner and outer peripheral portions being communicated with each other, said wet well portions of said inner and outer peripheral portions being separated from each other, said reactor containment vessel surrounding an operation floor, and said operation floor being communicatable with a space in said wet well portion of said outer peripheral portion via a pressure release valve.

3. A reactor containment vessel comprising an internal structural wall provided within said reactor containment vessel, said internal structural wall constituting a dry well portion for containing a reactor pressure vessel, and an inner peripheral portion of a pressure control chamber for condensing steam in said dry well portion, said internal structure wall being surrounded by said reactor containment vessel of steel in such a manner that said internal structural wall is spaced from a reactor containment vessel wall to form an outer peripheral portion of said pressure control chamber, said reactor containment vessel being disposed in an outer peripheral pool, said inner and outer peripheral portions having respective pressure control pool portions and respective wet well portions disposed above said pressure control pool portions, said pressure control pool portions of said inner and outer peripheral portions being communicated with each other, said wet well portions of said inner and outer peripheral portions being separated from each other, said reactor containment vessel surrounding an operation floor, said operation floor being communicatable with a space in said wet well portion of said outer peripheral portion via a pressure release valve, and that portion of said reactor containment vessel which surrounds said operation floor being covered with a wall having a gas inlet at its lower portion and a gas outlet at its upper portion.

4. A reactor containment vessel comprising an internal structural wall provided within said reactor containment vessel, said internal structural wall constituting a dry well portion for containing a reactor pressure vessel, and an inner peripheral portion of a pressure control chamber for condensing steam in said dry well portion, said internal structure wall being surrounded by said reactor containment vessel of steel in such a manner that said internal structural wall is spaced from a reactor containment vessel wall to form an outer peripheral portion of said pressure control chamber, said reactor containment vessel being disposed in an outer peripheral pool, said inner and outer peripheral portions having respective pressure control pool portions and respective wet well portions disposed above said pressure control pool portions, said pressure control pool portions of said inner and outer peripheral portions being communicated with each other, said wet well portions of said inner and outer peripheral portions being separated from each other, said reactor containment vessel surrounding an operation floor, said operation floor being communicatable with a space in said wet well portion of said outer peripheral portion via a pressure release valve, that portion of said reactor containment vessel which surrounds said operation floor being covered with a wall having a gas inlet at its lower portion and a gas outlet at its upper portion, and a radiator plate being provided in a space between said wall and said that portion of said reactor containment vessel surrounding said operation floor.

5. A reactor containment vessel comprising a dry well portion for containing a reactor pressure vessel, means delimiting an inner peripheral portion of a pressure control chamber for condensing steam in said dry well portion and an outer peripheral portion of said pressure control chamber, said reactor containment vessel being disposed in an outer peripheral pool, said inner and outer peripheral portions having respective pressure control pool portions and respective wet well portions disposed above said pressure control pool portion, said pressure control pool portions of said inner and outer peripheral portions being communicated with each other, and said wet well portions of said inner and outer peripheral portions being separated from each other.

6. A reactor containment vessel according to claim 1, further comprising a vent tube within the reactor containment vessel, and wherein the inner structural wall delimits the pressure control chamber into an inner peripheral portions and an outer peripheral portion so that upon occurrence of an accident, non-condensable gas from the drywell portion is enabled to be accumulated in the inner peripheral portion whereby accumulation of gas in the wet well portion of the inner peripheral portion and pressure of the uncondensable gas therein increases relatively rapidly due to a limited volume of the inner peripheral portion as delimited by the internal structural wall, thereby effecting a rapid raising of the level of the pressure control pool in the outer peripheral portion and increased contact of the pressure control pool with the containment vessel of steel so as to improve heat transfer efficiency from the pressure control chamber to the outer peripheral pool through the containment vessel of steel.

7. A reactor containment vessel according to claim 5, further comprising a vent tube within the reactor containment vessel, and wherein the reactor containment vessel has a metal wall portion disposed in the outer peripheral pool and the delimiting means includes an internal structural wall is spaced from the metal wall portion of the reactor containment vessel so that the outer peripheral portion of the pressure control chamber is disposed between the inner structural wall and the metal wall portion of the containment vessel, whereby upon occurrence of an accident, a contact area of the pressure control pool portion of the outer peripheral portion and that of the metal wall portion of the reactor containment vessel increases in accordance with a rise in level of the pressure control pool portion in the outer peripheral portion so that heat transfer efficiency from the pressure control chamber to the outer peripheral pool through the metal wall portion of the reactor containment vessel is enhanced.

* * * * *